(12) United States Patent
Amano

(10) Patent No.: US 8,699,152 B2
(45) Date of Patent: Apr. 15, 2014

(54) PROJECTION ZOOM LENS AND PROJECTION DISPLAY APPARATUS

(71) Applicant: FujiFilm Corporation, Tokyo (JP)

(72) Inventor: Masaru Amano, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/957,823

(22) Filed: Aug. 2, 2013

(65) Prior Publication Data

US 2013/0314800 A1   Nov. 28, 2013

Related U.S. Application Data

(63) Continuation of application No. PCT/JP2012/001239, filed on Feb. 23, 2012.

(30) Foreign Application Priority Data

Feb. 24, 2011   (JP) ................................. 2011-038204

(51) Int. Cl.
*G02B 9/62* (2006.01)
(52) U.S. Cl.
USPC .......................................... 359/761
(58) Field of Classification Search
USPC .......................................... 359/663, 756, 761
See application file for complete search history.

(56) References Cited

U.S. PATENT DOCUMENTS

| | | | | |
|---|---|---|---|---|
| 6,639,737 B2 * | 10/2003 | Yasui et al. | ............... | 359/761 |
| 2005/0200967 A1 | 9/2005 | Yamasaki et al. | | |
| 2006/0061872 A1 | 3/2006 | Yamasaki | | |
| 2006/0187556 A1 | 8/2006 | Inoko | | |
| 2006/0244939 A1 | 11/2006 | Sugita | | |
| 2007/0103793 A1 | 5/2007 | Inoko | | |
| 2008/0231967 A1 | 9/2008 | Inoko | | |
| 2011/0013151 A1 | 1/2011 | Nagahara | | |

FOREIGN PATENT DOCUMENTS

| | | |
|---|---|---|
| JP | 2004-138640 | 5/2004 |
| JP | 2005-266103 | 9/2005 |
| JP | 2005-283672 | 10/2005 |
| JP | 2006-084971 | 3/2006 |
| JP | 2006-234893 | 9/2006 |
| JP | 2006-308890 | 11/2006 |
| JP | 2007-178894 | 7/2007 |
| JP | 2009-020189 | 1/2009 |
| JP | 2011-022282 | 2/2011 |

OTHER PUBLICATIONS

International Search Report, PCT/JP2012/001239, Jun. 12, 2012.

* cited by examiner

*Primary Examiner* — Joseph P Martinez
(74) *Attorney, Agent, or Firm* — Young & Thompson

(57) ABSTRACT

A projection zoom lens having broad angle of view, high zoom ratio, and large back focus while aberrations are corrected satisfactorily, including a negative first lens group, a positive second lens group, a positive third lens group, a negative fourth lens group, a positive fifth lens group, and a positive sixth lens group from the magnification side and is telecentric on the reduction side. When zooming, the first and sixth lens groups are fixed while the second to fifth lens groups are moved and the fourth lens group is composed of one negative lens whose magnification side surface has a greater curvature in absolute value than that of the reduction side surface, and the zoom lens satisfies conditional expression (1): −12.0<f4/fw<−5.0, where f4 is focal length of the fourth lens group, and fw is focal length of the entire lens system at the wide angle end.

18 Claims, 18 Drawing Sheets

FIG.1A
MAGNIFICATION SIDE ←−Z
REDUCTION SIDE +Z→
201
101
Ln2c  Ln41  Ln51  Ln53
        Sn4a  Ln52  Ln54
        Sn4b        Ln55
                         300
Z1
G1  G2  G3  G4  G5 G6
St
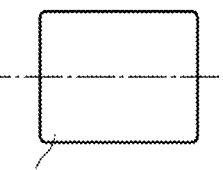
FIG.1B
MAGNIFICATION SIDE ←−Z
REDUCTION SIDE +Z→
202
102
Ln41
300
Z1
G1  G2  G3  G4  G5 G6
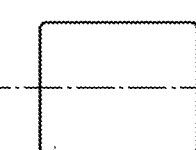
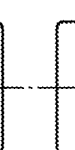

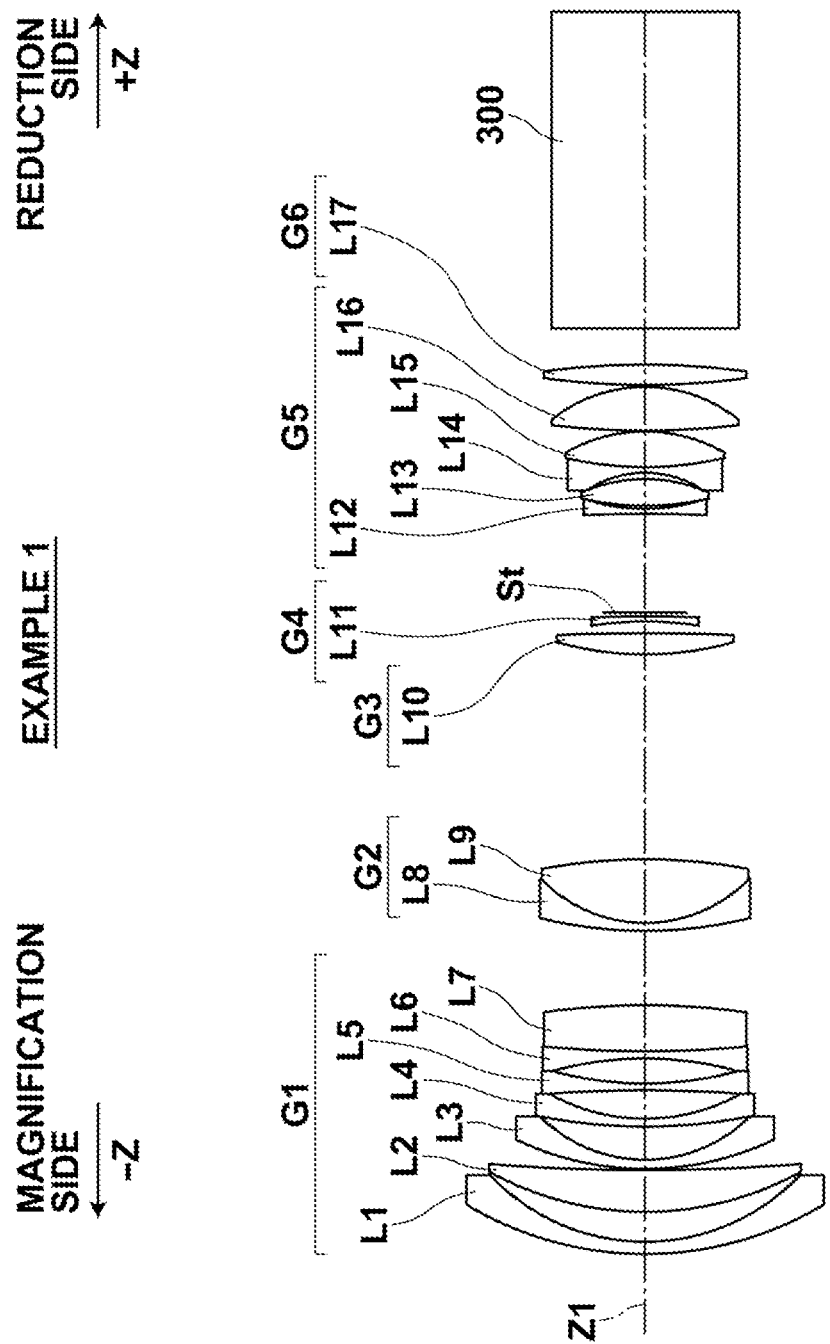

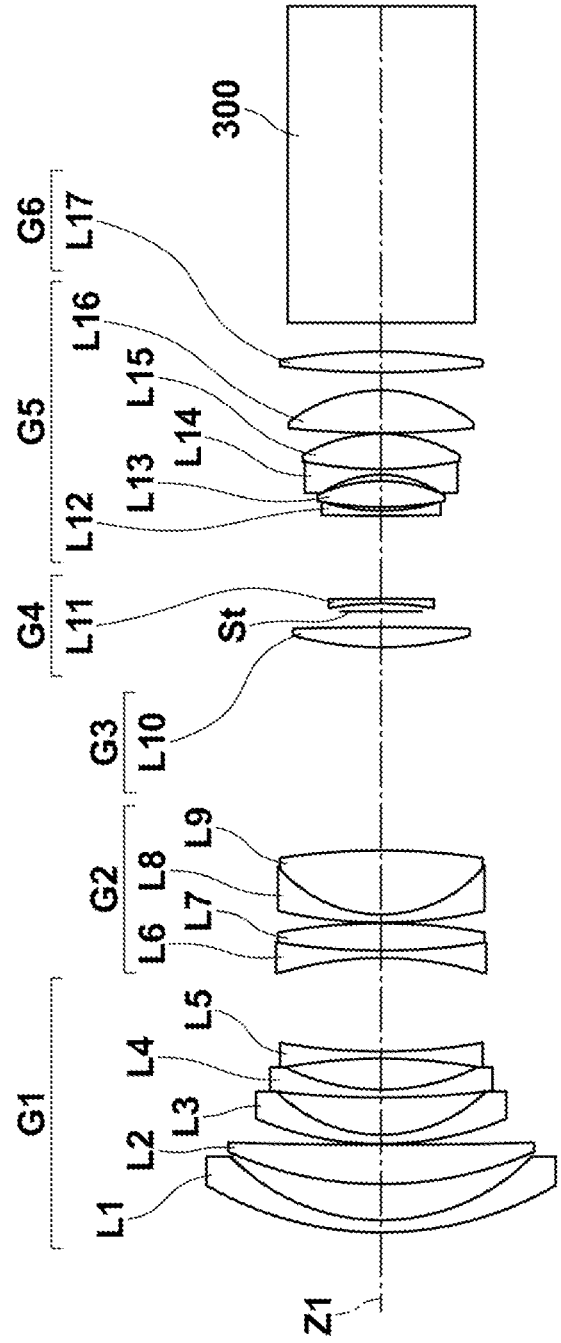

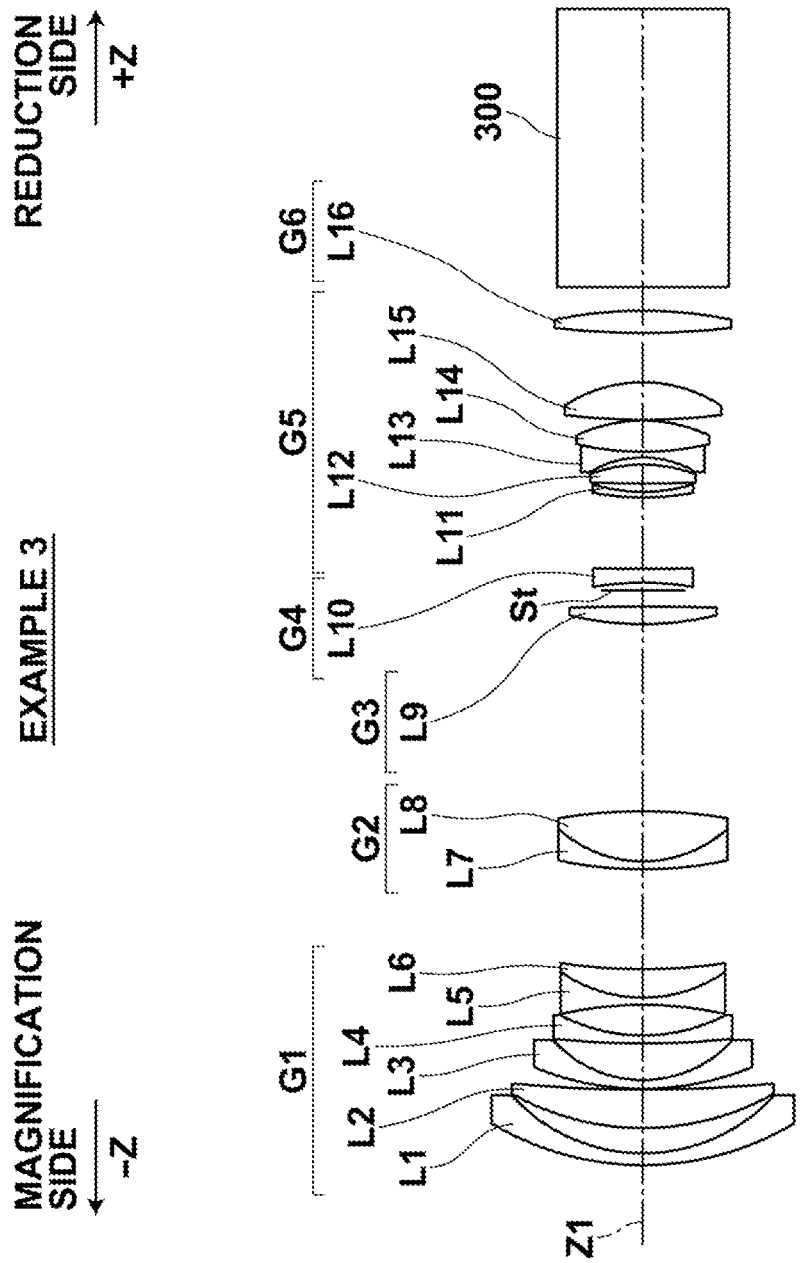

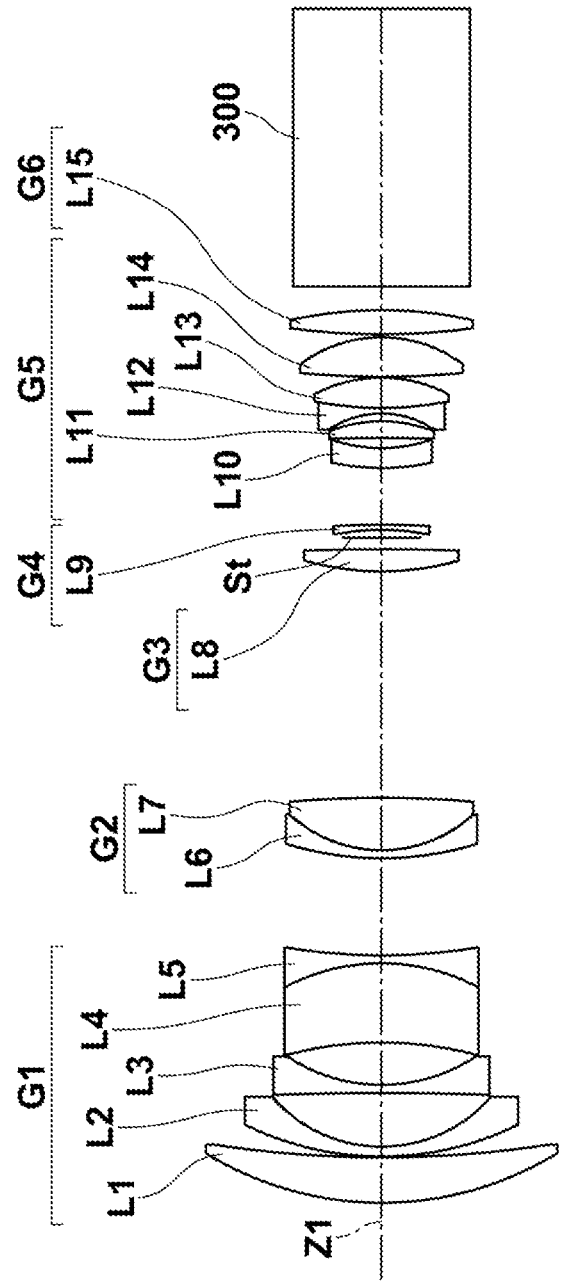

PROJECTION ZOOM LENS AND PROJECTION DISPLAY APPARATUS

BACKGROUND OF THE INVENTION

1. Field of the Invention

The present invention relates to a projection zoom lens that includes six lens groups and a projection display apparatus using the same.

2. Description of the Related Art

Recently, projection display devices using a transmissive or reflective liquid crystal or projection display devices using a light valve, such as DMD display devices, have been used widely. As projection lenses for use with such projection display devices, projection lenses that use zoom lenses capable of changing the size of a projection image have been used increasing as described, for example, in Japanese Unexamined Patent Publication No. 2004-138640 (Patent Document 1), Japanese Unexamined Patent Publication No. 2006-234893 (Patent Document 2), and Japanese Unexamined Patent Publication No. 2009-020189 (Patent Document 3). Recently, zoom lenses having a high rate of change in the size of a projection image, i.e., having a high zoom ratio have been demanded.

Further, a lens shift function for laterally shifting a projection image and a function for displaying a large image with a short projection distance have become demanded for the projection display devices. In order to respond to such demands, it is necessary to broaden the angle of view of the zoom lens.

Further, for an optical system that uses a plurality of light valves, a space for inserting a luminous flux combining optical system, such as a combining prism or the like, for combining each color luminous flux from each light valve is required, thereby resulting in a long back focus.

SUMMARY OF THE INVENTION

The projection zoom lens described in Patent Document 1 has neither a high zoom ratio nor a large angle of view that satisfy the recent market needs. The projection zoom lens described in Patent Document 2 has a relatively high zoom ratio of not less than 1.5 but the current market demands a lens having a broader angle of view than that of the projection zoom lens described in Patent Document 2. The projection zoom lens described in Patent Document 3 has a high zoom ratio of not less than 1.5 with a large total angle of view of not less than 60°, but it cannot be said that it ensures a sufficient back focus.

The present invention has been developed in view of the circumstances described above, and it is an object of the present invention to provide a projection zoom lens having a broad angle of view, a high zoom ratio, and a large back focus while various types of aberrations are satisfactorily corrected. It is a further object of the present invention to provide a projection display apparatus using the projection zoom lens.

A first projection zoom lens of the present invention is a zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:

the projection zoom lens is configured such that the first and sixth lens groups are fixed while the second to fifth lens groups are moved along the optical axis at the time of zooming;

the fourth lens group is composed of one negative lens whose magnification side surface has a greater curvature in absolute value than that of the reduction side surface; and the zoom lens satisfies a conditional expression (1) given below:

$$-12.0 < f4/fw < -5.0 \tag{1}$$

where:

f4 is a focal length of the fourth lens group; and fw is a focal length of the entire lens system at the wide angle end.

Preferably, the fifth lens group is composed of a negative lens, a positive lens, a negative lens with a concave surface on the magnification side, a positive lens with a convex surface on the reduction side, and a positive lens arranged in this order from the magnification side.

Preferably, the projection zoom lens is configured to satisfy a conditional expression (2): $3.0 < f5/fw < 10.0$, where f5 is a focal length of the fifth lens group.

Preferably, the second lens group includes a cemented lens composed of a negative lens with a concave surface on the reduction side and a positive lens with a convex surface on the reduction side.

Preferably, the projection zoom lens satisfies a conditional expression (3): $1.8 < Bf/fw < 4.0$, where Bf is an air equivalent back focus of the entire lens system on the reduction side.

Preferably, the projection zoom lens satisfies a conditional expression (4): $ft/fw \geq 1.5$ and a conditional expression (5): $2\omega > 65°$, where: ft is a focal length of the entire lens system at the telephoto end and $2\omega$ is a total angle of view at the wide angle end when projection is performed onto the magnification side.

Preferably, the projection zoom lens includes a variable aperture stop for changing the size of the aperture diameter according to the zooming on the magnification side or reduction side of the fourth lens group, and the variable aperture stop is configured to maintain the F-number of the projection zoom lens constant at the time of zooming.

Preferably, the projection zoom lens is configured such that focusing is performed by moving the first lens group in an optical axis direction.

A second projection zoom lens of the present invention is a zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:

the projection zoom lens is configured such that the first and sixth lens groups are fixed while the second to fifth lens groups are moved along the axis of the projection zoom lens at the time of zooming;

the fourth lens group is composed of one meniscus shaped negative lens with a convex surface on the reduction side; and the zoom lens satisfies a conditional expression (6): $30 < vd$, where vd is an Abbe number of the negative lens constituting the fourth lens group with respect to d-line.

The term "telecentric on the reduction side" as used herein refers to that the angle bisector line on the cross-section of each luminous flux converging on an arbitrary point on the reduction side is nearly parallel with the optical axis. That is, this is not limited to the case of being exact telecentric, i.e., the angle bisector line is exactly parallel with the optical axis and includes the case where the angle bisector line is nearly parallel with the optical axis with some errors. The term "with some errors" as used herein refers to that the inclination of the angle bisector line with respect to the optical axis is within ±3°.

The luminous flux cross-section described above is a cross-section cut by a plane passing the optical axis. The angle bisector line is a bisecting line on the cross-section of each converging luminous flux that divides the convergent angle into equal halves.

A projection display apparatus of the present invention is an apparatus, including the first projection zoom lens or the second projection zoom lens of the present invention, a light source, a light valve, and an illumination optical unit for guiding a luminous flux from the light source to the light valve, wherein the luminous flux from the light source is optically modulated by the light valve and the optically modulated luminous flux is projected onto a screen through the projection zoom lens.

According to the first projection zoom lens of the present invention and the first projection display apparatus of the present invention, a first lens group having a negative power, a second lens group having a positive power, a third lens group having a positive power, a fourth lens group having a negative power, a fifth lens group having a positive power, and a sixth lens group having a positive power are arranged in this order from the magnification side and the reduction side is made telecentric, in which the projection zoom lens is configured such that the first and sixth lens groups are fixed while the second to fifth lens groups are moved along the axis of the projection zoom lens at the time of zooming, the fourth lens group is composed of one negative lens whose magnification side surface has a greater curvature in absolute value than that of the reduction side surface of the lens, and the zoom lens is configured to satisfy the conditional expression (1): $-12.0 < f4/fw < -5.0$. This allows the projection zoom lens and projection display apparatus to have a wide angle of field, a high zoom ratio, and a long back focus while various types of aberrations are corrected satisfactorily. For example, a back focus that allows easy insertion of a luminous flux combining optical system may be ensured.

Generally, the amount of movement of each lens group is inevitably increased in a zoom lens having a high zoom ratio. If the amount of movement of each lens group is increased as described above, deterioration in the balance of aberrations, such as spherical aberration and field curvature, occurs at the wide angle end and telephoto end. Consequently, by giving a negative power to an intermediate lens group of the moving lens groups (e.g., the fourth lens group), that is, by disposing a lens group that operates correctively to a large extent between lens groups having a large amount of movement and a large amount of zooming, the deterioration in the balance of aberrations, such as spherical aberration and field curvature, at the wide angle end and telephoto end may be reduced.

Further, as the projection zoom lens is configured to satisfy the conditional expression (1), the corrective operation effect may be obtained reliably and the deterioration in the balance of aberrations, such as spherical aberration and field curvature, at the wide angle end and telephoto end may be reduced reliably while ensuring a high zoom ratio.

If the projection zoom lens exceeds the upper limit of the conditional expression (1), the negative power of the fourth lens group becomes too strong and the axial light ray is excessively bent upward, so that not only the aforementioned balance deterioration cannot be prevented but also the spherical aberration correction itself becomes difficult.

On the other hand, if the projection zoom lens falls below the lower limit of the conditional expression (1), the negative power of the fourth lens group becomes too weak, so that not only a large corrective operation effect cannot be given to the balance but also it is difficult to secure a large back focus.

The composition of the fourth lens group with only one negative lens whose magnification side surface has a greater curvature in absolute value than that of the reduction side surface allows reduced manufacturing costs.

According to the second projection zoom lens of the present invention and the second projection display apparatus of the present invention, the fourth lens group is composed of one meniscus shaped negative with a convex surface on the reduction side and the zoom lens is configured to satisfy the conditional expression (6): $30 < vd$. This allows a variation in chromatic aberration at the time of zooming to be minimized.

BRIEF DESCRIPTION OF THE DRAWINGS

FIG. 1A is a cross-sectional view of a projection zoom lens and projection display apparatus in a first embodiment of the present invention, illustrating a schematic configuration thereof.

FIG. 1B is a cross-sectional view of a projection zoom lens and projection display apparatus in a second embodiment of the present invention, illustrating a schematic configuration thereof.

FIG. 2A is a cross-sectional view of a projection zoom lens of Example 1.

FIG. 3A is a cross-sectional view of a projection zoom lens of Example 2.

FIG. 4A is a cross-sectional view of a projection zoom lens of Example 3.

FIG. 5A is a cross-sectional view of a projection zoom lens of Example 4.

DESCRIPTION OF THE PREFERRED EMBODIMENTS

Figure 2B:
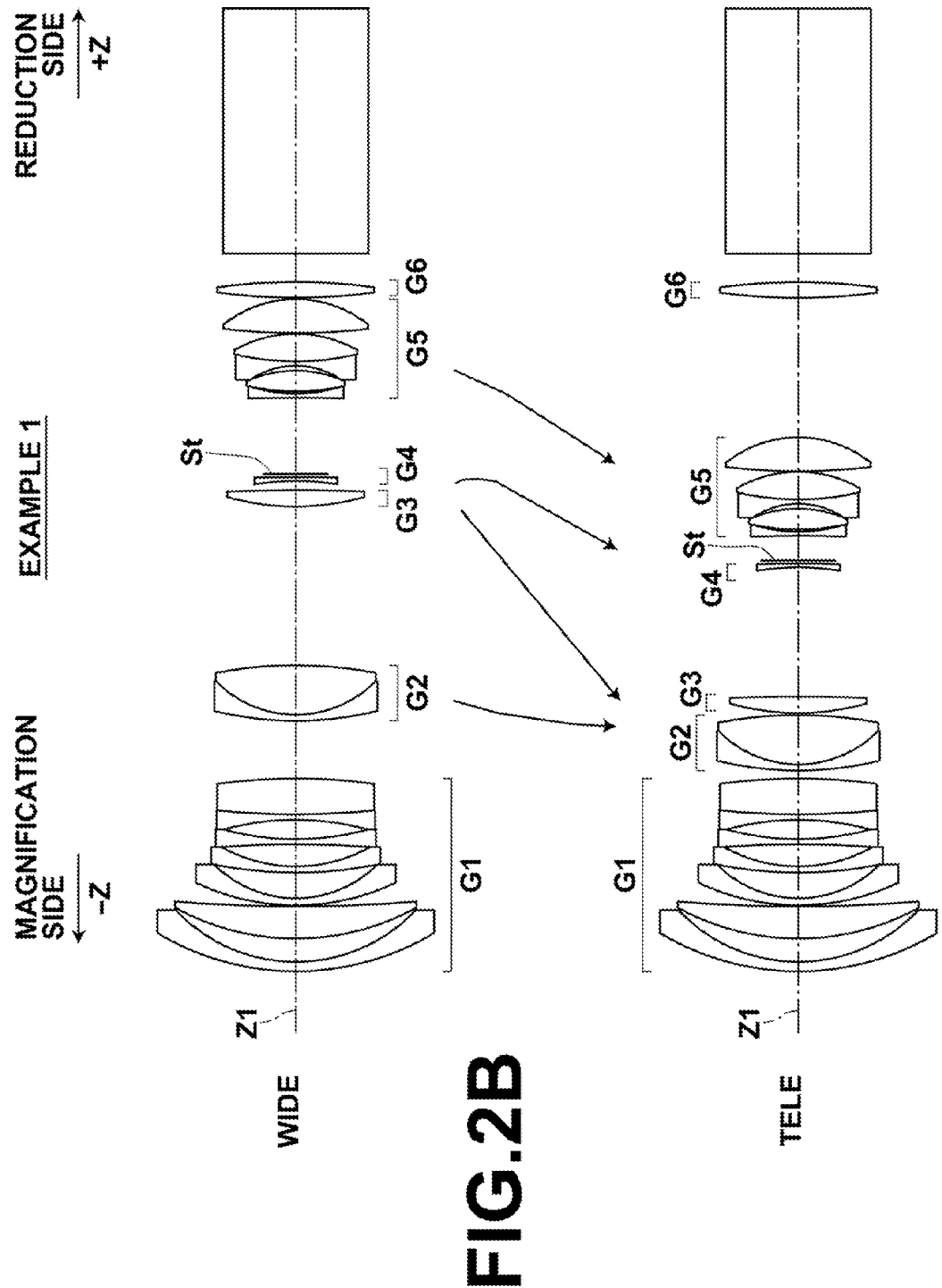
FIG. 2B comparatively illustrates the positions of each lens group of the projection zoom lens of Example 1 at the wide angle end and telephoto end.

Hereinafter, a projection zoom lens of the present invention and a projection display apparatus having the projection zoom lens will be described with reference to the accompanying drawings.

A first embodiment of the present invention will be described first.

FIG. 1A is a cross-sectional view of a projection zoom lens of a first embodiment of the present invention and projection display apparatus using the projection zoom lens, illustrating a schematic configuration thereof.

A projection zoom lens 101 according to the first embodiment of the present invention includes a first lens group G1 having a negative power, a second lens group G2 having a positive power, a third lens group G3 having a positive power, a fourth lens group G4 having a negative power, a fifth lens group G5 having a positive power, and a sixth lens group G6 having a positive power arranged in this order along the optical axis Z1 from the magnification side (side indicated by the arrow −Z in the drawing) The optical system of the projection zoom lens 101 on the reduction side is of a substantially telecentric configuration.

The projection zoom lens 101 is configured such that the first lens group G1 and sixth lens groups G6 are fixed while the second lens group G2, third lens group G3, fourth lens group G4, and fifth lens groups G5 are moved along the optical axis Z1 when zooming is performed.

The fourth lens group G4 is composed of only a fourth group first lens Ln41 which is a negative lens whose magnification side surface Sn4$a$ has a greater curvature in absolute value than that of the reduction side surface Sn4$b$ (side indicated by the arrow +Z in the drawing) and satisfies a conditional expression (1): $-12.0<f4/fw<-5.0$, where f4 is a focal length of the fourth lens group G4 and fw is a focal length of the entire lens system at the wide angle end.

Preferably, the fourth group first lens Ln41 constituting the fourth lens group G4 is configured to satisfy a conditional expression (1A): $-10.0<f4/fw<-5.0$.

The fifth lens group G5 may be composed of a fifth group first lens Ln51 having a negative power, a fifth group second lens Ln52 having a positive power, a fifth group third lens Ln53 having a negative power with a concave surface on the magnification side, a fifth group fourth lens Ln54 having a positive power with a convex surface on the reduction side, and a fifth group fifth lens Ln55 having a positive power arranged in this order from the magnification side.

Preferably, when the focal length of the fifth lens group G5 is taken as f5, the projection zoom lens 101 satisfies a conditional expression (2): $3.0<f5/fw<10.0$ and, more preferably, a conditional expression (2A): $4.0<f5/fw<8.0$.

The conditional expression (2) is a conditional expression with respect to coma aberration and the coma aberration may be corrected satisfactorily by satisfying the conditional expression (2).

The second lens group G2 may be composed of at least a cemented lens Ln2$c$ constituted by a negative lens with a concave surface on the reduction side and a positive lens with a convex surface on the reduction side.

Preferably, if the air equivalent back focus of the entire lens system on the reduction side is taken as Bf, the projection zoom lens 101 satisfies a conditional expression (3): $1.8<Bf/fw<4.0$ and, more preferably, a conditional expression (3A): $2.0<Bf/fw<3.0$.

The conditional expression (3) is a conditional expression for defining the size of the back focus. If the projection zoom lens falls below the lower limit of the conditional expression (3), it becomes difficult to insert a color combining prism, which is a luminous flux combining optical system, or the like between the projection zoom lens and the light valve. On the other hand, exceeding of the upper limit of the conditional expression (3) will lead to an increase in the lens size.

Preferably, the projection zoom lens 101 satisfies a conditional expression (4):ft/fw1.5 and a conditional expression (5): $2\omega>65°$, where ft is a focal length of the entire lens system at the telephoto end and $2\omega$ is a total angle of view at the wide angle end when projection is performed onto the magnification side.

The conditional expression (4) defines the zoom ratio which is the ratio between focal lengths at the wide angle end and telephoto end. If the projection zoom lens falls below the lower limit of the conditional expression (4), the projection zoom lens cannot respond to the demand for a high zoom ratio. The conditional expression (5) defines the total angle of view at the wide angle end. If the projection zoom lens falls below the lower limit of the conditional expression (5), the projection zoom lens cannot respond to the demand for a broad angle of view.

The projection zoom lens 101 may include a variable aperture stop St which is an aperture stop for changing the size of the aperture according to zooming on the magnification side of the fourth lens group G4 (between the third lens group G3 and fourth lens group G4 here) or on the reduction side of the fourth lens group G4 (between the fourth lens group G4 and fifth lens group G5 here). The variable aperture stop St is configured to maintain the F-number of the projection zoom lens constant at the time of zooming.

The projection zoom lens 101 may be configured such that focusing is performed by moving the first lens group G1 in an optical axis direction. Note that the focusing is performed for correcting an out of focus state of the projection zoom lens that occurs when the projection distance of the projection zoom lens (the distance from a screen 1 to be described later to the projection zoom lens 101) is changed. In the mean time, at the time of zooming, the second to fifth lens groups G2 to G5 are moved to perform the zooming and focus correction simultaneously.

A second embodiment of the present invention will now be described.

FIG. 1B is a cross-sectional view of a projection zoom lens of a second embodiment of the present invention and projection display apparatus using the projection zoom lens, illustrating a schematic configuration thereof.

A projection zoom lens 102 according to the second embodiment of the present invention includes a first lens group G1 having a negative power, a second lens group G2 having a positive power, a third lens group G3 having a positive power, a fourth lens group G4 having a negative power, a fifth lens group G5 having a positive power, and a sixth lens group G6 having a positive power arranged in this order along the optical axis Z1 from the magnification side (side indicated by the arrow −Z in the drawing) as in the projection zoom lens 101. The optical system of the projection zoom lens 102 on the reduction side is of a substantially telecentric configuration.

The projection zoom lens 102 is configured such that the first lens group G1 and sixth lens groups G6 are fixed while the second lens group G2, third lens group G3, fourth lens group G4, and fifth lens groups G5 are moved along the optical axis Z1 when zooming is performed, as in the projection zoom lens 101.

The fourth lens group G4 is composed of only a fourth group first lens Ln41 which is a meniscus shaped negative lens with a convex surface on the reduction side and satisfies a conditional expression (6): 30<vd, where f4 is an Abbe number of the negative lens (fourth group first lens Ln41) constituting the fourth lens group G4 with respect to d-line.

Next, projection display apparatuses using the aforementioned projection zoom lenses will be described.

A projection display apparatus 201 according to a first embodiment of the present invention illustrated in FIG. 1A includes the projection zoom lens 101 according to the first embodiment and a projection optical modulation unit 300 for optically modulating a luminous flux emitted from a light source with a light valve, in which the luminous flux optically modulated by the projection optical modulation unit 300 is projected onto a screen 1 through the projection zoom lens 101.

A projection display apparatus 202 according to a second embodiment of the present invention illustrated in FIG. 1B includes the projection zoom lens 102 according to the second embodiment and a projection optical modulation unit 300, which is identical to that described above, for optically modulating a luminous flux emitted from a light source with a light valve, in which the luminous flux optically modulated by the projection optical modulation unit 300 is projected onto a screen 1 through the projection zoom lens 102.

An example of the projection optical modulation unit 300 will be described with reference to FIG. 14.

Figure 14:
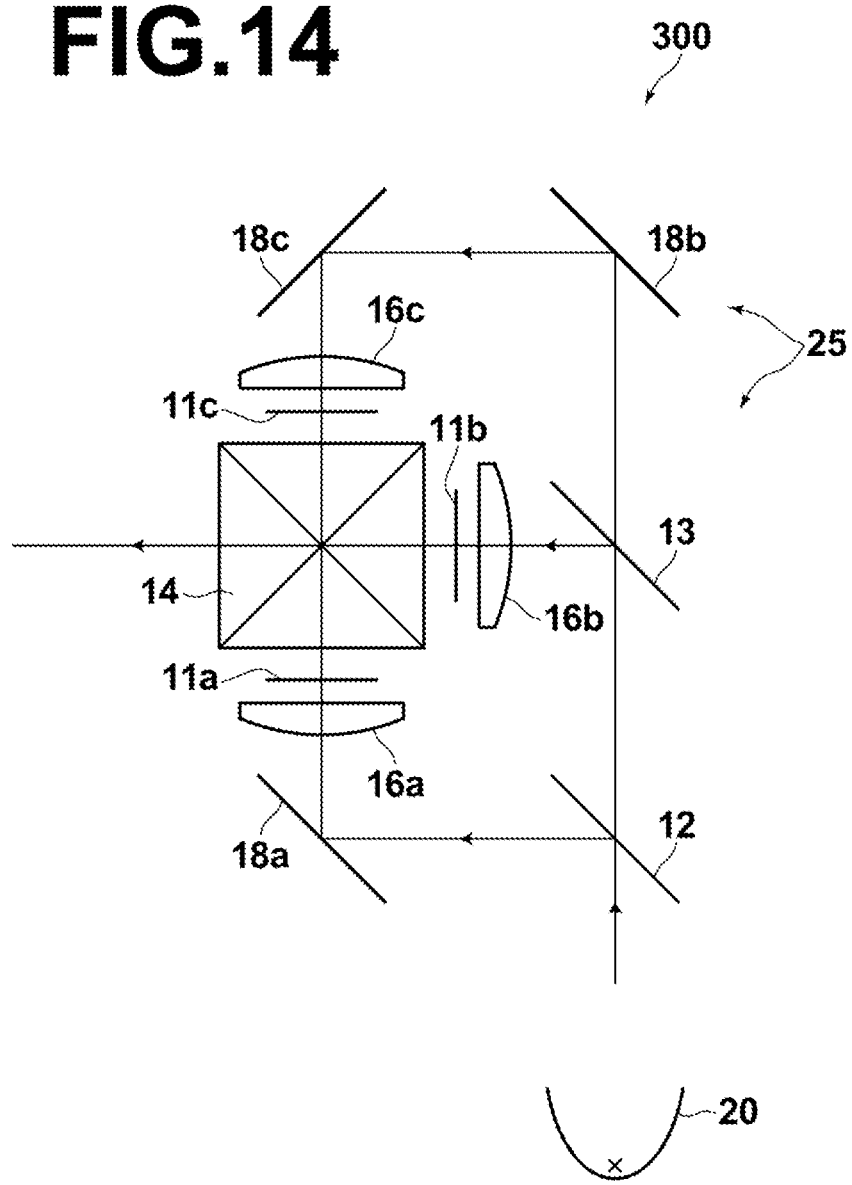
FIG. 14 illustrate a projection optical modulation unit of a projection display apparatus in an embodiment of the present invention.

The projection optical modulation unit 300 illustrated in FIG. 14 includes a light source 20, transmissive liquid crystal panels 11a, 11b, and 11c, which are light valves, an illumination optical unit 25 for guiding a luminous flux emitted from the light source 20 to each of the transmissive liquid crystal panels 11a to 11c, and a cross dichroic prism 14 which is a luminous flux combining optical system for combining luminous fluxes passing through the transmissive liquid crystal panels 11a to 11c. The illumination optical unit 25 includes an integrator (not shown) such as a fly's eye disposed between the light source 20 and dichroic mirror 12.

A white luminous flux emitted from the light source 20 is separated into three luminous fluxes of different colors (G light, B light, R light) through the illumination optical unit 25 and separated luminous fluxes are inputted to the corresponding liquid crystal panels 11a to 11c and optically modulated.

The respective luminous fluxes optically modulated through the liquid crystal panels 11a to 11c are color-combined by the cross dichroic prism 14 and the combined luminous flux is projected on to the screen 1 through the projection zoom lens 101 or 102.

The illumination optical unit 25 of the projection optical modulation unit 300 includes dichroic mirrors 12, 13, total reflection mirrors 18a, 18b, 18c, and condenser lenses 16a, 16b, 16c for color separation.

The projection optical modulation unit 300 is not limited to that using the transmissive liquid crystal display panels described above, and other optical modulation means, such as reflective liquid crystal display panels, DMDs, or the like may also be employed.

EXAMPLES

Hereinafter, specific Examples 1 to 4 of the projection zoom lens of the present invention will be described.

Note that Examples 1, 2, 3 and 4 are included in the first embodiment of the present invention. Examples 1, 2, and 4 are included in the second embodiment of the present invention, but Example 3 is not included in the second embodiment of the present invention.

Example 1

FIGS. 2A, 2B illustrate a projection zoom lens of Example 1. FIG. 2A illustrates the projection zoom lens in detail and FIG. 2B comparatively illustrates the positions of each lens group of the projection zoom lens of Example 1 at the wide angle end (indicated by "WIDE" in the drawing) and telephoto end (indicated by "TELE" in the drawing).

The projection zoom lens of Example 1 includes six lens groups and corresponds to both of the first invention and second invention. The first lens group G1 is composed of seven lenses of a first group first lens L1 to a first group seventh lens L7, the second lens group G2 is composed of two lenses of a second group first lens L8 and a second group second lens L9, and the third lens group G3 is composed of one lens of a third group first lens L10.

The fourth lens group G4 is composed of one lens of a fourth group first lens L11, the fifth lens group is composed of five lenses of a fifth group first lens L12 to fifth group fifth lens L16, and the sixth lens group is composed of one lens of a sixth group first lens L17.

The first group sixth lens L6 and first group seventh lens L7 are cemented, the second group first lens L8 and second group second lens L9 are cemented, and the fifth group third lens L14 and fifth group fourth lens L15 are cemented, thereby each forming a cemented lens.

At the time of zooming, the first lens group G1 and the sixth lens group G6 are fixed, while the second lens group G2 to the fifth lens group G5 are moved along the optical axis Z1 along with a transition from the wide angle end to the telephoto end. The movement of each lens group at the time of zooming or focusing is roughly identical in other examples described hereinafter.

The Lens data and other data of the projection zoom lens of Example 1 are shown in Table 1.

The focal length F of the entire lens system, radius of curvature R of each lens surface, center thickness of each lens and an air distance D between each lens, refractive index Nd and Abbe number vd of each lens with respect to d-line are shown on the upper side of Table 1. Note that the radius of curvature R is a normalized value with the focal length of the entire lens system at the wide angle end being taken as "1". The air distance D is also a value normalized in the same manner as in the radius of curvature R.

The focal length F indicates values at the wide angle end (WIDE), in the middle of zooming (MIDDLE), and at the telephoto end (TELE) in this order.

Each number under the "SURFACE No." in Table 1 and each table to be described later is the number of each lens surface, aperture stop, or the like, which is sequentially increased from the most magnification side (the side indicated by the arrow –Z in the drawing) to the reduction side (the side indicated by the arrow +Z in the drawing). Values under the symbols "R", "D", "Nd", and "vd" are values indicated in association with each "SURFACE No.".

Note the lens data include the projection optical modulation unit 300 as a plane parallel plate.

The distances between each lens group at the wide angle end (WIDE), in the middle of zooming (MIDDLE), and the telephoto end (TELE) are shown in the center of Table 1.

The projection distances and aperture diameters (variable aperture diameters) of the aperture stop St (variable aperture St) at the wide angle end (WIDE), in the middle of zooming (MIDDLE), and the telephoto end (TELE) are shown in the lower side of Table 1.

The above description with respect to the lens data and other data applies also to other examples shown hereinafter.

TABLE 1

EXAMPLE 1
F. LENGTH F = 1.00~1.44~1.86

| SURFACE No. | R | D | Nd | vd |
|---|---|---|---|---|
| 1 | 3.736 | 0.132 | 1.8052 | 25.42 |
| 2 | 2.289 | 0.322 | | |
| 3 | 3.471 | 0.449 | 1.7725 | 49.60 |
| 4 | 21.328 | 0.013 | | |
| 5 | 3.207 | 0.098 | 1.7725 | 49.60 |
| 6 | 1.600 | 0.357 | | |
| 7 | 5.846 | 0.085 | 1.7725 | 49.60 |
| 8 | 2.112 | 0.306 | | |
| 9 | −14.471 | 0.073 | 1.6968 | 55.53 |
| 10 | 3.793 | 0.269 | | |
| 11 | −3.772 | 0.077 | 1.6180 | 63.33 |
| 12 | 11.312 | 0.496 | 1.7380 | 32.26 |
| 13 | −7.879 | D13 | | |
| 14 | 4.732 | 0.086 | 1.7283 | 28.46 |
| 15 | 1.556 | 0.683 | 1.7380 | 32.26 |
| 16 | −5.998 | D16 | | |
| 17 | 3.484 | 0.226 | 1.6968 | 55.53 |
| 18 | −25.065 | D18 | | |
| 19 | −3.673 | 0.054 | 1.4875 | 70.23 |
| 20 | −23.500 | 0.043 | | |
| 21 | ∞ | D20 | (V. A. STOP) | |
| 22 | −19.340 | 0.055 | 1.6727 | 32.17 |
| 23 | 2.049 | 0.031 | | |
| 24 | 3.023 | 0.288 | 1.4970 | 81.61 |
| 25 | −1.668 | 0.069 | | |
| 26 | −1.130 | 0.060 | 1.7880 | 47.37 |
| 27 | 3.739 | 0.384 | 1.4970 | 81.61 |
| 28 | −1.715 | 0.009 | | |
| 29 | 8.740 | 0.470 | 1.4970 | 81.61 |
| 30 | −1.609 | D30 | | |
| 31 | 8.055 | 0.219 | 1.7859 | 44.20 |
| 32 | −8.148 | 0.392 | | |
| 33 | ∞ | 3.404 | 1.5163 | 64.14 |
| 34 | ∞ | | | |

| MOV. DISTANCE | WIDE | MIDDLE | TELE |
|---|---|---|---|
| D13 | 0.800 | 0.206 | 0.110 |
| D16 | 2.204 | 1.300 | 0.030 |
| D18 | 0.128 | 1.439 | 1.794 |
| D20 | 1.060 | 0.311 | 0.343 |
| D30 | 0.021 | 0.954 | 1.934 |
| PROJ. DISTANCE | 283.326 | 406.573 | 526.140 |
| V. A. DIAMETER | 0.447 | 0.463 | 0.514 |

Figure 6:
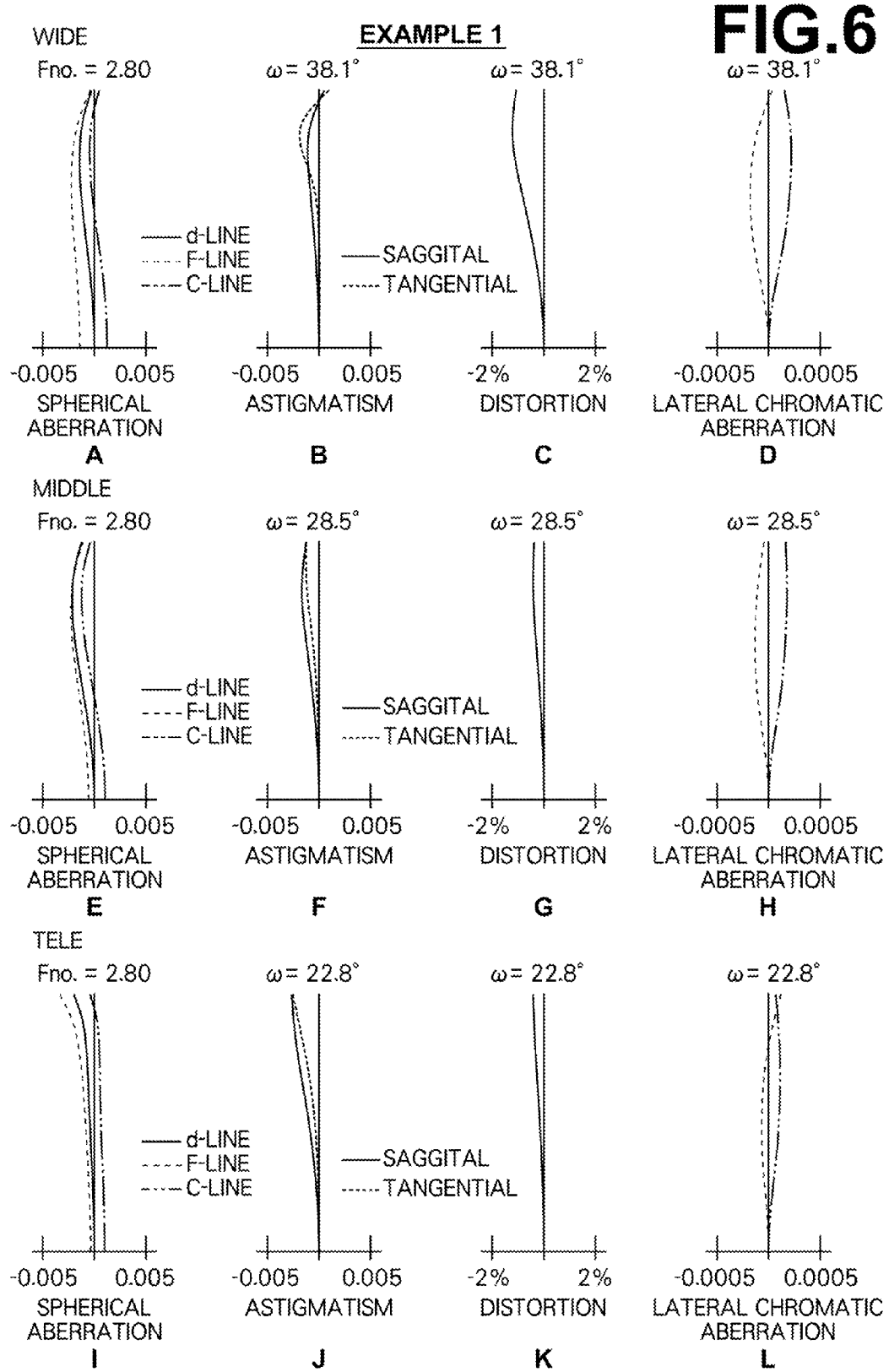
FIG. 6 illustrates aberration diagrams of various types of aberrations of projection zoom lens of Example 1.

FIG. 6 illustrates spherical aberrations, astigmatisms, distortions, and lateral chromatic aberrations of the projection zoom lens of Example 1 at the wide angle end (WIDE), in the middle of zooming (MIDDLE), and the telephoto end (TELE). FIG. 6 includes aberrations with respect to d-line, F-line and C-line. Each astigmatism diagram illustrates aberrations with respect to sagittal and tangential image planes.

In FIG. 6, the diagrams represented by the symbols A, E and I illustrate spherical aberrations, the diagrams represented by the symbols B, F, and J illustrate astigmatisms, the diagrams represented by the symbols C, G, and K illustrate distortions, and the diagrams represented by the symbols D, H, and L illustrate lateral chromatic aberrations.

Figure 10:
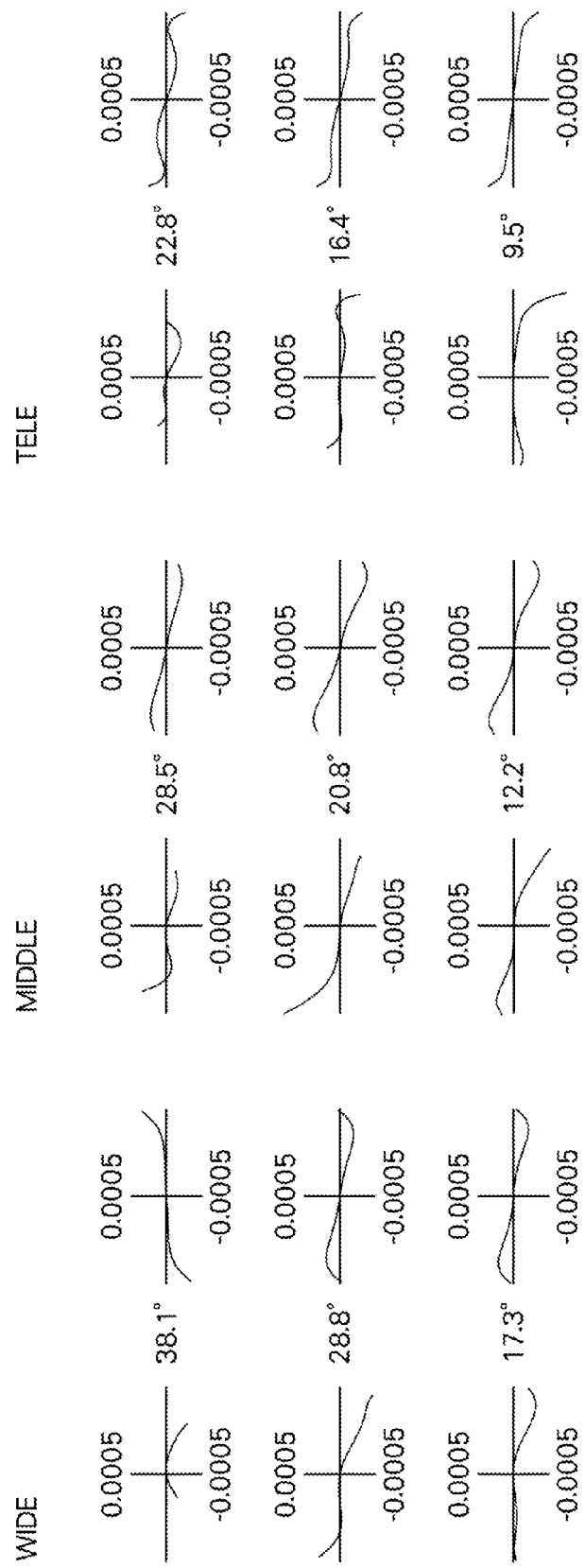
FIG. 10 illustrates aberration diagrams of lateral aberrations of projection zoom lens of Example 1.

FIG. 10 illustrates lateral aberrations of the projection zoom lens of Example 1 with respect to d-line at the wide angle end (WIDE), in the middle of zooming (MIDDLE), and the telephoto end (TELE). FIG. 10 illustrates aberrations with respect to three different half angles of view as the lateral aberrations. Aberration diagrams with respect to the same half angle of view in the tangential direction and sagittal direction are shown side by side in the horizontal direction in this order.

The above description with respect to the aberration diagrams applies also to other examples shown hereinafter.

As is known from FIGS. 6 and 10, and the like, the projection zoom lens of Example 1 has a wide angle of view 2ω of 76.2 degrees and each aberration is corrected satisfactorily.

As is known from Table 5 (provided at the end of the description of Examples) that indicates the value of each of the conditional expressions for each example, the projection zoom lens of Example 1 satisfies all of the conditional expressions (1) to (5). Such projection zoom lens of Example 1 may have a broad angle of view, a high zoom ratio, and a large back focus while various types of aberrations are satisfactorily corrected.

Example 2

Figure 3B:
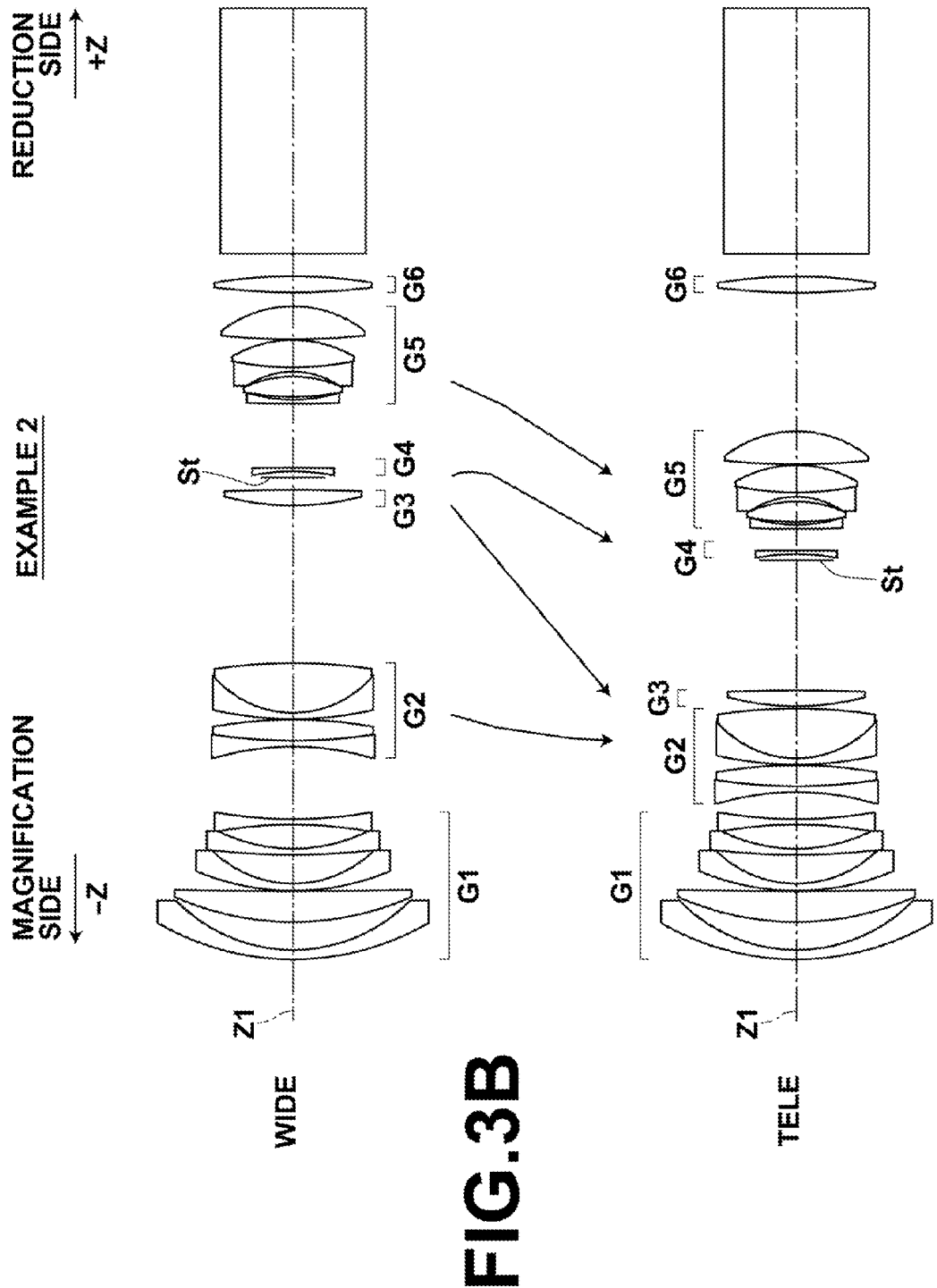
FIG. 3B comparatively illustrates the positions of each lens group of the projection zoom lens of Example 2 at the wide angle end and telephoto end.

FIGS. 3A, 3B illustrate a projection zoom lens of Example 2. FIG. 3A illustrates the projection zoom lens in detail and FIG. 3B comparatively illustrates the positions of each lens group of the projection zoom lens of Example 2 at the wide angle end (indicated by "WIDE" in the drawing) and telephoto end (indicated by "TELE" in the drawing). The projection zoom lens of Example 2 also includes six lens groups. The projection zoom lens of Example 1 includes six lens groups and corresponds to both of the first invention and second invention.

The first lens group G1 is composed of five lenses of a first group first lens L1 to a first group fifth lens L5, the second lens group G2 is composed of four lenses of a second group first lens L6 to a second group fourth lens L9, the third lens group G3 is composed of one lens of a third group first lens L10.

The fourth lens group G4 is composed of one lens of a fourth group first lens L11, the fifth lens group G5 is composed of five lenses of a fifth group first lens L12 to a fifth group fifth lens L16, and the sixth lens group G6 is composed of one lens of a sixth group first lens L17.

The second group first lens L6 and the second group second lens L7 are cemented, the second group third lens L8 and second group fourth lens L9 are cemented, and fifth group third lens L14 and the fifth group fourth lens L15 are cemented, thereby each forming a cemented lens.

The operations of each group of the projection zoom lens of Example 2 at the time of zooming and at the time of focusing are roughly identical to those of Example 1 described above.

The Lens data and other data of the projection zoom lens of Example 2 are shown in Table 2. The lens data and other data in the table are presented in the same way as in Example 1.

TABLE 2

EXAMPLE 2
F. LENGTH F = 1.00~1.44~1.86

| SURFACE No. | R | D | Nd | vd |
|---|---|---|---|---|
| 1 | 3.736 | 0.132 | 1.8052 | 25.42 |
| 2 | 2.262 | 0.388 | | |
| 3 | 4.051 | 0.425 | 1.7725 | 49.60 |
| 4 | 65.470 | 0.009 | | |
| 5 | 3.465 | 0.098 | 1.7725 | 49.60 |
| 6 | 1.596 | 0.400 | | |
| 7 | 9.850 | 0.085 | 1.7725 | 49.60 |
| 8 | 2.346 | 0.335 | | |
| 9 | −5.925 | 0.077 | 1.7292 | 54.68 |
| 10 | 6.361 | D10 | | |
| 11 | −3.830 | 0.082 | 1.5163 | 64.14 |
| 12 | 7.234 | 0.293 | 1.8340 | 37.16 |
| 13 | −6.248 | 0.009 | | |
| 14 | 4.978 | 0.086 | 1.7283 | 28.46 |
| 15 | 1.448 | 0.691 | 1.7380 | 32.26 |
| 16 | −7.355 | D16 | | |
| 17 | 3.659 | 0.218 | 1.7292 | 54.68 |

TABLE 2-continued

EXAMPLE 2
F. LENGTH F = 1.00~1.44~1.86

| | | | | |
|---|---|---|---|---|
| 18 | −25.269 | D18 | | |
| 19 | ∞ | 0.085 | (V. A. STOP) | |
| 20 | −3.120 | 0.051 | 1.5174 | 52.43 |
| 21 | −32.006 | D21 | | |
| 22 | 19.710 | 0.056 | 1.6990 | 30.05 |
| 23 | 2.119 | 0.040 | | |
| 24 | 3.658 | 0.281 | 1.4970 | 81.61 |
| 25 | −1.633 | 0.068 | | |
| 26 | −1.130 | 0.060 | 1.8040 | 46.57 |
| 27 | 4.215 | 0.380 | 1.4970 | 81.61 |
| 28 | −1.666 | 0.009 | | |
| 29 | 9.572 | 0.460 | 1.4970 | 81.61 |
| 30 | −1.610 | D30 | | |
| 31 | 8.982 | 0.226 | 1.7440 | 44.78 |
| 32 | −6.607 | 0.313 | | |
| 33 | ∞ | 3.409 | 1.5163 | 64.14 |
| 34 | ∞ | | | |

| MOV. DISTANCE | WIDE | MIDDLE | TELE |
|---|---|---|---|
| D10 | 1.006 | 0.478 | 0.374 |
| D16 | 2.187 | 1.252 | 0.033 |
| D18 | 0.170 | 1.385 | 1.810 |
| D21 | 0.891 | 0.320 | 0.300 |
| D30 | 0.192 | 1.008 | 1.927 |
| PROJ. DISTANCE | 283.765 | 407.202 | 526.950 |
| V. A. DIAMETER | 0.438 | 0.463 | 0.510 |

Figure 7:
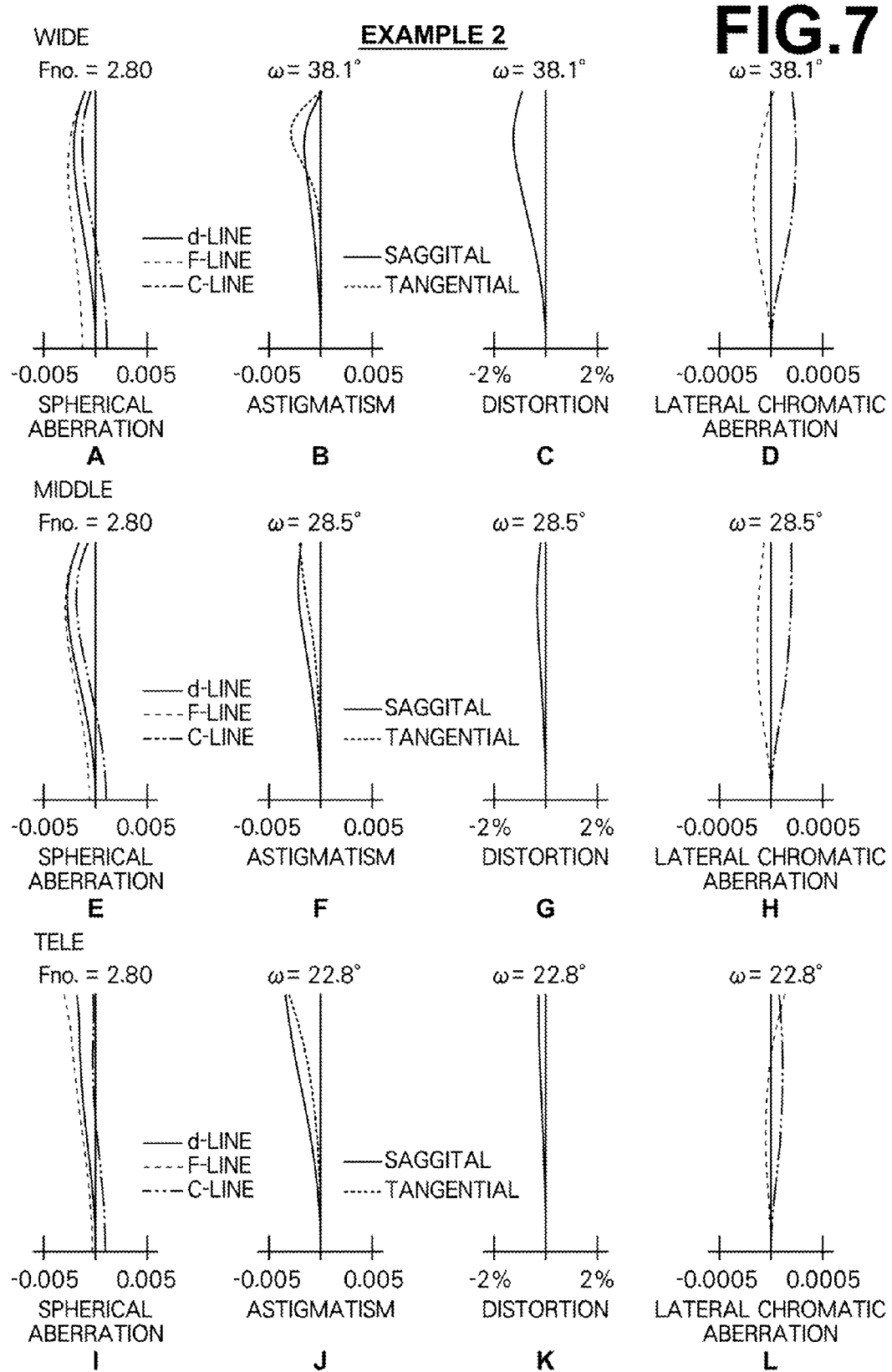
FIG. 7 illustrates aberration diagrams of various types of aberrations of projection zoom lens of Example 2.
Figure 11:
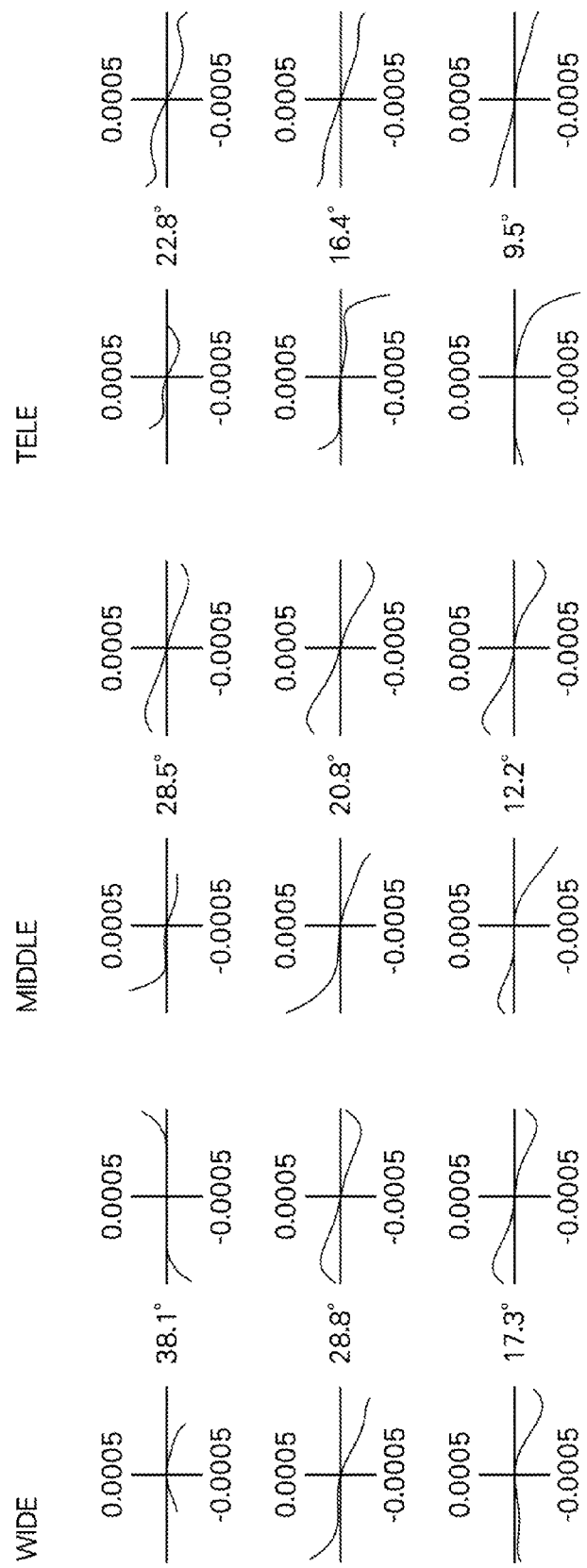
FIG. 11 illustrates aberration diagrams of lateral aberrations of projection zoom lens of Example 2.

FIG. 7 illustrates various types of aberrations and FIG. 11 illustrates lateral aberration diagrams of the projection zoom lens of Example 2. These drawings are presented in the same way as in Example 1.

As is known from FIGS. 7 and 11, and the like, the projection zoom lens of Example 2 has a wide angle of view 2ω of 76.2 degrees and each aberration is corrected satisfactorily.

As is known from Table 5 that indicates the value of each of the conditional expressions for each example, the projection zoom lens of Example 2 satisfies all of the conditional expressions (1) to (5). Such projection zoom lens of Example 2 may have a broad angle of view, a high zoom ratio, and a large back focus while various types of aberrations are satisfactorily corrected.

Example 3

Figure 4B:
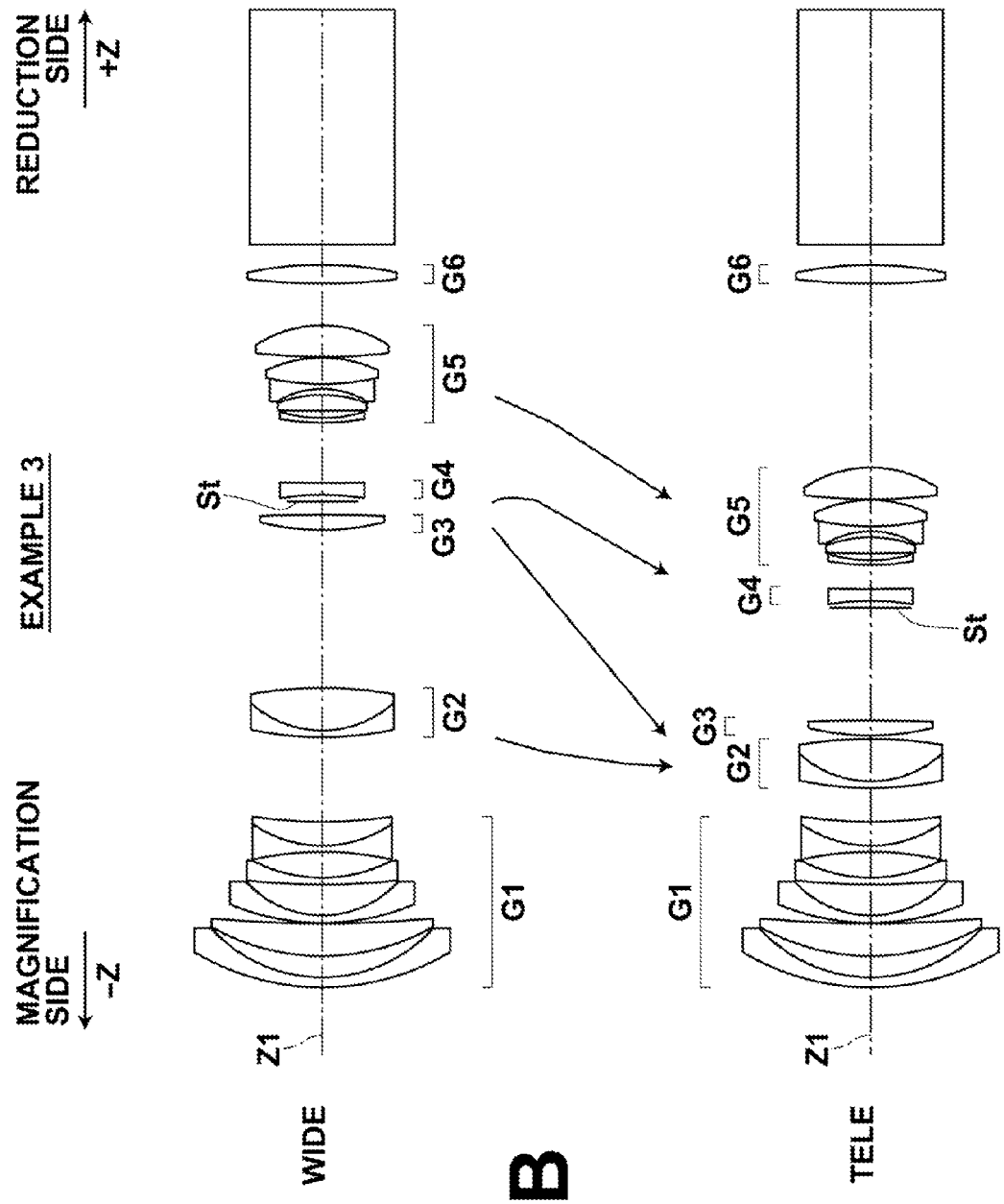
FIG. 4B comparatively illustrates the positions of each lens group of the projection zoom lens of Example 3 at the wide angle end and telephoto end.

FIGS. 4A, 4B illustrate a projection zoom lens of Example 3. FIG. 4A illustrates the projection zoom lens in detail and FIG. 4B comparatively illustrates the positions of each lens group of the projection zoom lens of Example 3 at the wide angle end (indicated by "WIDE" in the drawing) and telephoto end (indicated by "TELE" in the drawing). The projection zoom lens of Example 3 also includes six lens groups and corresponds to the first invention but does not correspond to the second invention.

The first lens group G1 is composed of six lenses of a first group first lens L1 to a first group sixth lens L6, the second lens group G2 is composed of two lenses of a second group first lens L7 and a second group second lens L8, the third lens group G3 is composed of one lens of a third group first lens L9.

The fourth lens group G4 is composed of one lens of a fourth group first lens L10, the fifth lens group G5 is composed of five lenses of a fifth group first lens L11 to a fifth group fifth lens L15, and the sixth lens group G6 is composed of one lens of a sixth group first lens L16.

The first group fifth lens L5 and first group sixth lens L6 are cemented, the second group first lens L7 and the second group second lens L8 are cemented, and the fifth group third lens L13 and the fifth group fourth lens L14 are cemented, thereby each forming a cemented lens.

The operations of each group of the projection zoom lens of Example 3 at the time of zooming and at the time of focusing are roughly identical to those of Example 1 described above.

The Lens data and other data of the projection zoom lens of Example 3 are shown in Table 3. The lens data and other data in the table are presented in the same way as in Example 1.

TABLE 3

EXAMPLE 3
F. LENGTH F = 1.00~1.44~1.86

| SURFACE No. | R | D | Nd | vd |
|---|---|---|---|---|
| 1 | 3.180 | 0.128 | 1.8052 | 25.4 2 |
| 2 | 1.921 | 0.271 | | |
| 3 | 2.878 | 0.415 | 1.7725 | 49.60 |
| 4 | 15.371 | 0.009 | | |
| 5 | 3.075 | 0.094 | 1.7725 | 49.60 |
| 6 | 1.305 | 0.394 | | |
| 7 | 9.257 | 0.086 | 1.7725 | 49.60 |
| 8 | 1.926 | 0.330 | | |
| 9 | −4.025 | 0.077 | 1.6180 | 63.33 |
| 10 | 1.561 | 0.305 | 1.7725 | 49.60 |
| 11 | 6.038 | D11 | | |
| 12 | 4.337 | 0.086 | 1.8052 | 25.42 |
| 13 | 1.355 | 0.541 | 1.8000 | 29.84 |
| 14 | −5.408 | D14 | | |
| 15 | 3.292 | 0.191 | 1.7130 | 53.87 |
| 16 | −23.235 | D16 | | |
| 17 | ∞ | 0.086 | (V. A. STOP) | |
| 18 | −3.288 | 0.151 | 1.5174 | 52.43 |
| 19 | 28.323 | D19 | | |
| 20 | 2.938 | 0.060 | 1.8052 | 25.42 |
| 21 | 1.868 | 0.091 | | |
| 22 | 20.159 | 0.202 | 1.4970 | 81.54 |
| 23 | −1.621 | 0.078 | | |
| 24 | −1.107 | 0.060 | 1.7880 | 47.37 |
| 25 | 3.168 | 0.336 | 1.4970 | 81.54 |
| 26 | −1.668 | 0.009 | | |
| 27 | 7.002 | 0.404 | 1.4970 | 81.54 |
| 28 | −1.538 | D28 | | |
| 29 | 8.531 | 0.238 | 1.5891 | 61.14 |
| 30 | −4.802 | 0.257 | | |
| 31 | ∞ | 2.993 | 1.5163 | 64.14 |
| 32 | ∞ | | | |

| MOV. DISTANCE | WIDE | MIDDLE | TELE |
|---|---|---|---|
| D11 | 1.075 | 0.537 | 0.429 |
| D14 | 2.011 | 1.210 | 0.042 |
| D16 | 0.170 | 1.162 | 1.437 |
| D19 | 0.767 | 0.229 | 0.306 |
| D28 | 0.531 | 1.416 | 2.340 |
| PROJ. DISTANCE | 283.972 | 407.500 | 527.336 |
| V. A. DIAMETER | 0.445 | 0.483 | 0.541 |

Figure 8:
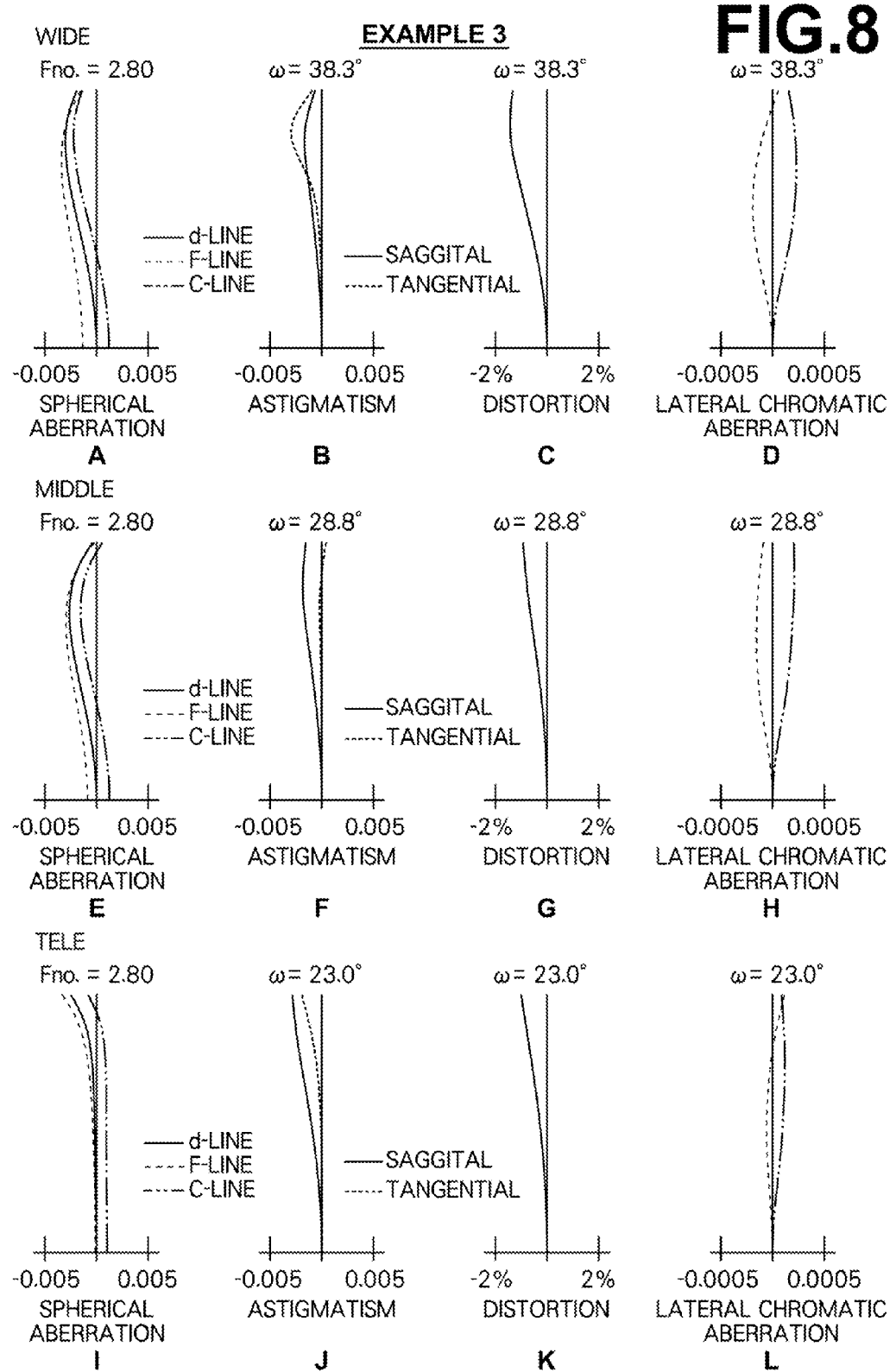
FIG. 8 illustrates aberration diagrams of various types of aberrations of projection zoom lens of Example 3.
Figure 12:
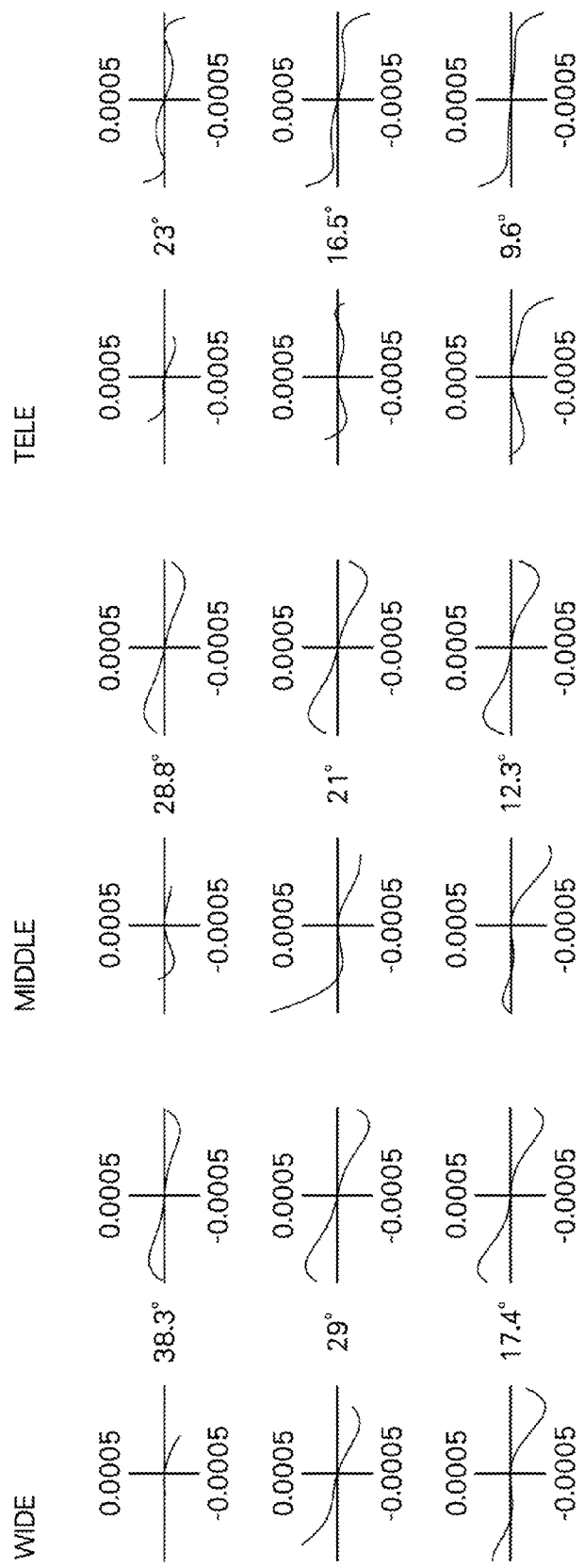
FIG. 12 illustrates aberration diagrams of lateral aberrations of projection zoom lens of Example 3.

FIG. 8 illustrates various types of aberrations and FIG. 12 illustrates lateral aberration diagrams of the projection zoom lens of Example 3. These drawings are presented in the same way as in Example 1.

As is known from FIGS. 8 and 12, and the like, the projection zoom lens of Example 3 has a wide angle of view 2ω of 76.6 degrees and each aberration is corrected satisfactorily.

As is known from Table 5 that indicates the value of each of the conditional expressions for each example, the projection zoom lens of Example 3 satisfies all of the conditional expressions (1) to (5). Such projection zoom lens of Example 3 may have a broad angle of view, a high zoom ratio, and a large back focus while various types of aberrations are satisfactorily corrected.

Example 4

Figure 5B:
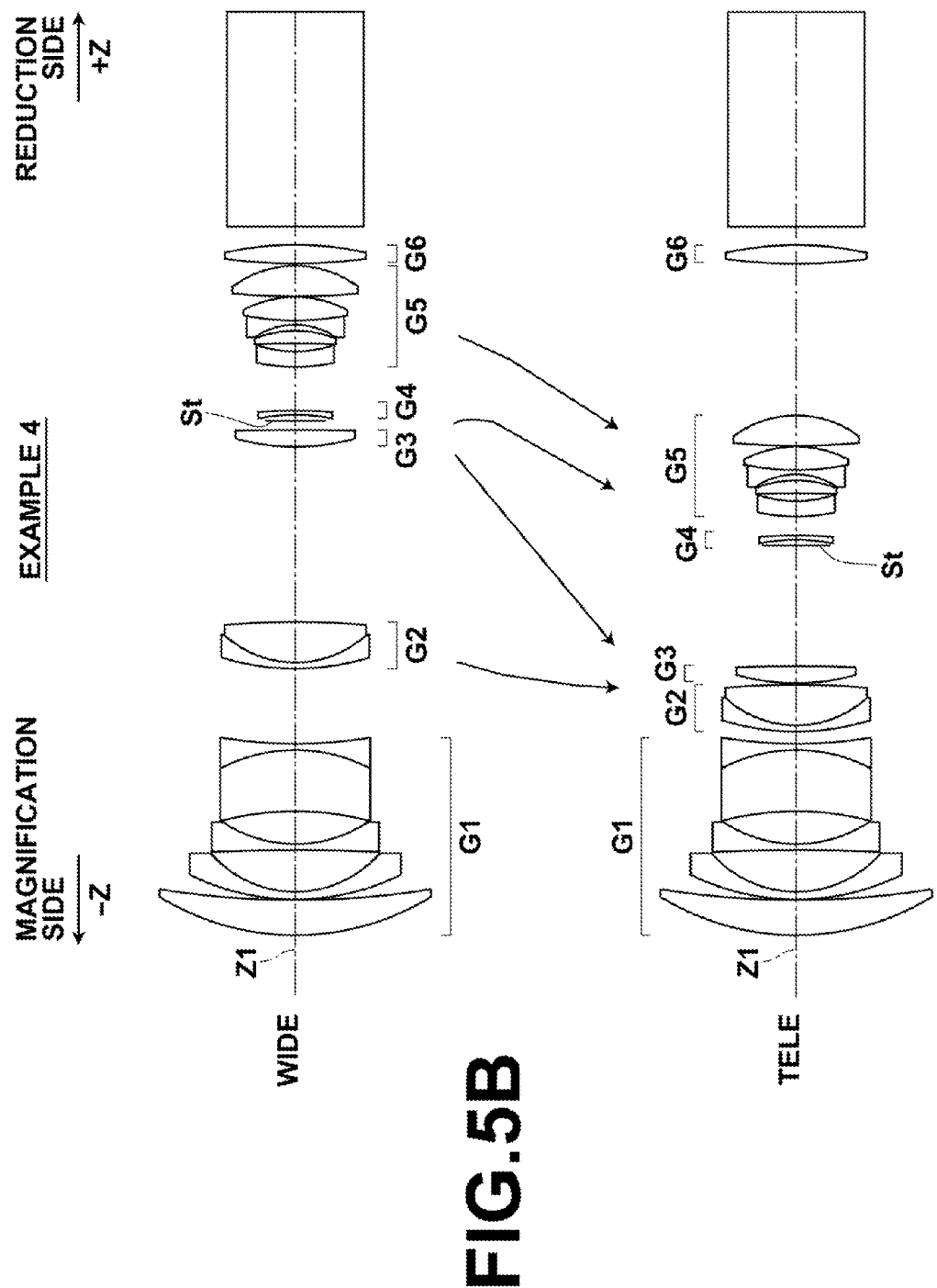
FIG. 5B comparatively illustrates the positions of each lens group of the projection zoom lens of Example 4 at the wide angle end and telephoto end.

FIGS. 5A, 5B illustrate a projection zoom lens of Example 4. FIG. 5A illustrates the projection zoom lens in detail and FIG. 5B comparatively illustrates the positions of each lens group of the projection zoom lens of Example 4 at the wide angle end (indicated by "WIDE" in the drawing) and telephoto end (indicated by "TELE" in the drawing). The projection zoom lens of Example 4 also includes six lens groups and corresponds to both of the first invention and second invention.

The first lens group G1 is composed of five lenses of a first group first lens L1 to a first group fifth lens L5, the second lens group G2 is composed of two lenses of a second group first lens L6 to a second group second lens L7, the third lens group G3 is composed of one lens of a third group first lens L8.

The fourth lens group G4 is composed of one lens of a fourth group first lens L9, the fifth lens group G5 is composed of five lenses of a fifth group first lens L10 to a fifth group fifth lens L14, and the sixth lens group G6 is composed of one lens of a sixth group first lens L15.

The first group fourth lens L4 and first group fifth lens L5 are cemented, the second group first lens L6 and second group second lens L7 are cemented, and the fifth group third lens L12 and fifth group fourth lens L13 are cemented, thereby each forming a cemented lens.

The operations of each group of the projection zoom lens of Example 4 at the time of zooming and at the time of focusing are roughly identical to those of Example 1 described above.

The Lens data and other data of the projection zoom lens of Example 4 are shown in Table 4. The lens data and other data in the table are presented in the same way as in Example 1.

TABLE 4

EXAMPLE 4
F. LENGTH F = 1.00~1.44~2.00

| SURFACE No. | R | D | Nd | νd |
|---|---|---|---|---|
| 1 | 3.551 | 0.481 | 1.7292 | 54.68 |
| 2 | 11.772 | 0.008 | | |
| 3 | 3.255 | 0.105 | 1.7550 | 52.32 |
| 4 | 1.536 | 0.569 | | |
| 5 | −27.174 | 0.084 | 1.8052 | 25.42 |
| 6 | 1.804 | 0.448 | | |
| 7 | −3.918 | 0.837 | 1.8061 | 33.27 |
| 8 | −2.188 | 0.084 | 1.5163 | 64.14 |
| 9 | 6.214 | D9 | | |
| 10 | 3.409 | 0.084 | 1.8052 | 25.42 |
| 11 | 1.438 | 0.555 | 1.8000 | 29.84 |
| 12 | −11.260 | D12 | | |
| 13 | 2.998 | 0.232 | 1.6516 | 58.55 |
| 14 | −31.051 | D14 | | |
| 15 | ∞ | 0.084 | (V. A. STOP) | |
| 16 | −2.503 | 0.054 | 1.6259 | 35.70 |
| 17 | −8.194 | D17 | | |
| 18 | 2.459 | 0.211 | 1.7995 | 42.22 |
| 19 | 1.633 | 0.108 | | |
| 20 | −15.883 | 0.175 | 1.4970 | 81.54 |
| 21 | −1.511 | 0.082 | | |
| 22 | −0.995 | 0.059 | 1.7859 | 44.20 |
| 23 | 3.620 | 0.322 | 1.4970 | 81.54 |
| 24 | −1.513 | 0.008 | | |
| 25 | 9.298 | 0.417 | 1.4970 | 81.54 |
| 26 | −1.432 | D26 | | |
| 27 | 7.207 | 0.256 | 1.6180 | 63.33 |
| 28 | −4.484 | 0.376 | | |
| 29 | ∞ | 2.934 | 1.5163 | 64.14 |
| 30 | ∞ | | | |

TABLE 4-continued

EXAMPLE 4
F. LENGTH F = 1.00~1.44~2.00

| MOV. DISTANCE | WIDE | MIDDLE | TELE |
|---|---|---|---|
| D9 | 1.026 | 0.344 | 0.1679 |
| D12 | 2.393 | 1.591 | 0.0204 |
| D14 | 0.124 | 1.204 | 1.6465 |
| D17 | 0.597 | 0.159 | 0.2621 |
| D26 | 0.030 | 0.871 | 2.0709 |
| PROJ. DISTANCE | 278.350 | 399.430 | 516.892 |
| V. A. DIAMETER | 0.409 | 0.438 | 0.504 |

Figure 9:
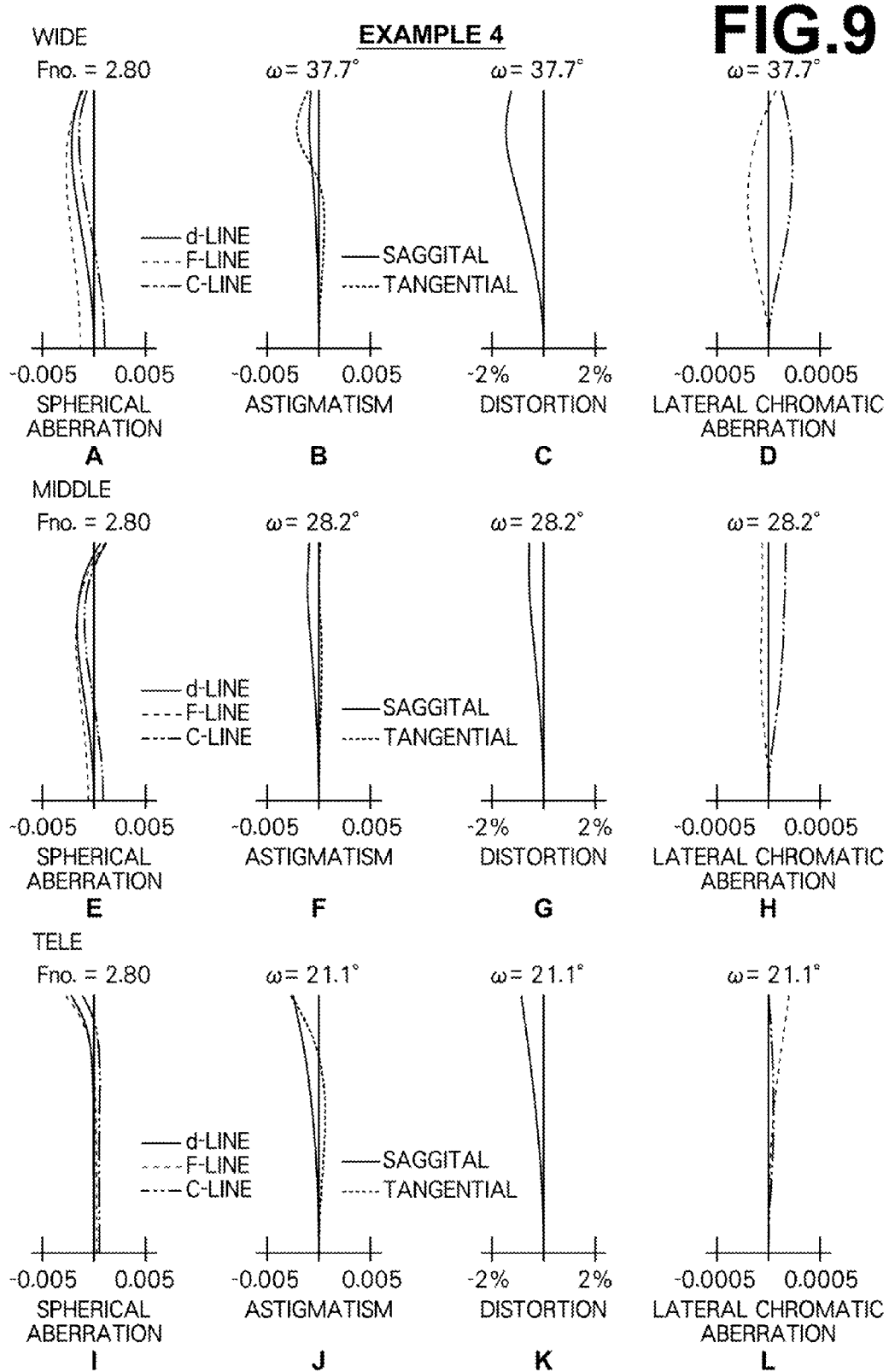
FIG. 9 illustrates aberration diagrams of various types of aberrations of projection zoom lens of Example 4.
Figure 13:
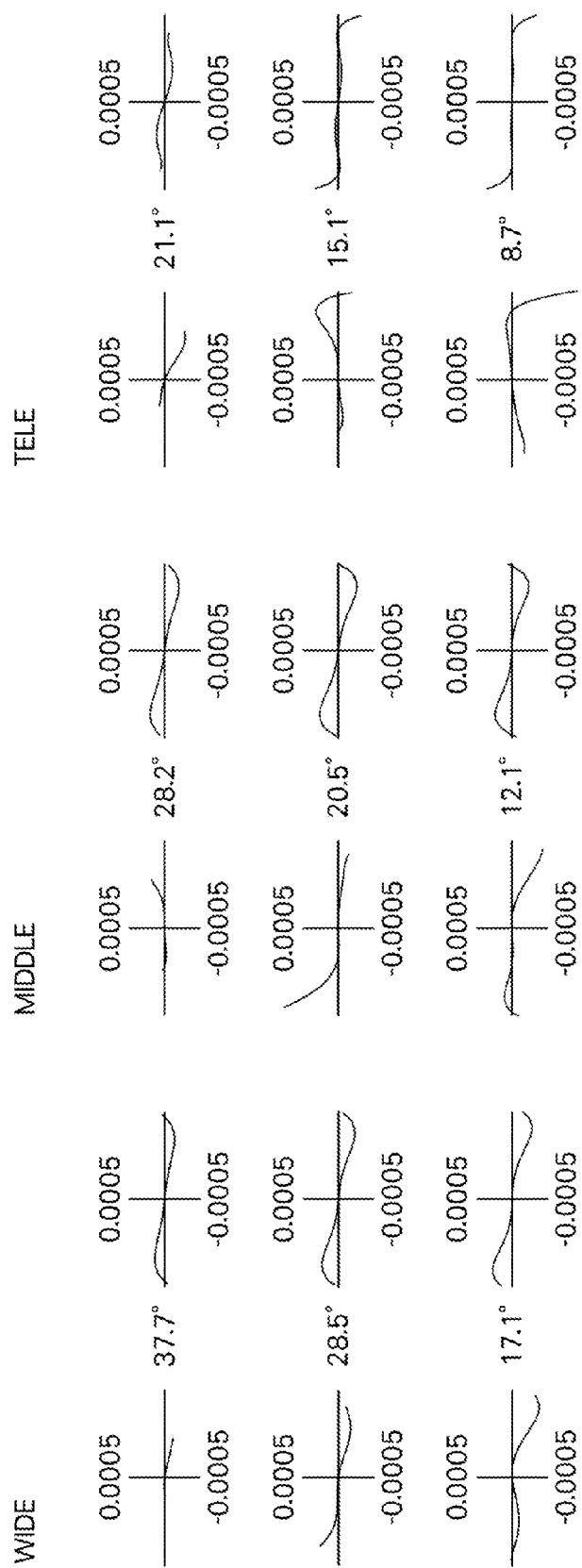
FIG. 13 illustrates aberration diagrams of lateral aberrations of projection zoom lens of Example 4.

FIG. 9 illustrates various types of aberrations and FIG. 13 illustrates lateral aberration diagrams of the projection zoom lens of Example 3. These drawings are presented in the same way as in Example 1.

As is known from FIGS. 9 and 13, and the like, the projection zoom lens of Example 4 has a wide angle of view 2ω of 75.4 degrees and each aberration is corrected satisfactorily.

As is known from Table 5 that indicates the value of each of the conditional expressions for each example, the projection zoom lens of Example 4 satisfies all of the conditional expressions (1) to (5). Such projection zoom lens of Example 4 may have a broad angle of view, a high zoom ratio, and a large back focus while various types of aberrations are satisfactorily corrected.

As described above, according to the projection zoom lens and projection display apparatus of the present invention, a broad angle of view, a high zoom ratio, and a great back focus may be ensured while various types of aberrations may be corrected satisfactorily.

The present invention is not limited to each of the examples described above, and various alternative examples are possible without departing from the spirit of the present invention. For example, values of radius of curvature of each lens, surface distance, refractive index, and the like are not limited to those shown in each table and may take other values.

TABLE 5

| | C. EXP (1) f4/fw | C. EXP (2) f5/fw | C. EXP (3) Bf/fw | C. EXP (4) ft/fw | C. EXP (5) 2ω |
|---|---|---|---|---|---|
| EXAMPLE 1 | −8.94 | 6.83 | 2.63 | 1.86 | 76.20 |
| EXAMPLE 2 | −6.69 | 5.80 | 2.56 | 1.86 | 76.20 |
| EXAMPLE 3 | −5.68 | 5.04 | 2.23 | 1.86 | 76.60 |
| EXAMPLE 4 | −5.78 | 6.10 | 2.31 | 2.00 | 75.40 |
| UPPER LIMIT | −5.00 | 10.00 | 4.00 | | |
| LOWER LIMIT | −12.00 | 3.00 | 1.80 | 1.50 | 65.00 |

What is claimed is:

1. A projection zoom lens substantially consisting of a first lens group having a negative power, a second lens group having a positive power, a third lens group having a positive power, a fourth lens group having a negative power, a fifth lens group having a positive power, and a sixth lens group having a positive power arranged in this order from the magnification side and is configured telecentric on the reduction side, wherein:
the projection zoom lens is configured such that the first and sixth lens groups are fixed while the second to fifth lens groups are moved along the optical axis at the time of zooming;
the fourth lens group is composed of one negative lens whose magnification side surface has a greater curvature in absolute value than that of the reduction side surface;

the fifth lens group is composed of a negative lens, a positive lens, a negative lens with a concave surface on the magnification side, a positive lens with a convex surface on the reduction side, and a positive lens arranged in this order from the magnification side; and the zoom lens satisfies a conditional expression (1) given below:

$$-12.0 < f4/fw < -5.0 \quad (1),$$

where:
f4 is a focal length of the fourth lens group; and
fw is a focal length of the entire lens system at the wide angle end.

2. The projection zoom lens of claim 1, wherein the projection zoom lens satisfies a conditional expression (2) given below:

$$3.0 < f5/fw < 10 \quad (2),$$

where f5 is a focal length of the fifth lens.

3. The projection zoom lens of claim 2, wherein the projection zoom lens satisfies a conditional expression (2A) given below:

$$4.0 < f5/fw < 8.0 \quad (2A).$$

4. The projection zoom lens of claim 2, wherein the second lens group comprises at least a cemented lens composed of a negative lens with a concave surface on the reduction side and a positive lens with a convex surface on the reduction side.

5. The projection zoom lens of claim 2, wherein the projection zoom lens satisfies a conditional expression (3) given below:

$$1.8 < Bf/fw < 4.0 \quad (3),$$

where, Bf is an air equivalent back focus of the entire lens system on the reduction side.

6. The projection zoom lens of claim 2, wherein the projection zoom lens satisfies a conditional expression (4) and a conditional expression (5) given below:

$$ft/fw \geq 1.5 \quad (4); \text{ and}$$

$$2\omega > 65° \quad (5),$$

where:
ft is a focal length of the entire lens system at the telephoto end; and
2ω is a total angle of view at the wide angle end.

7. The projection zoom lens of claim 2, wherein the projection zoom lens includes a variable aperture stop for changing the size of the aperture diameter according to the zooming on the magnification side or reduction side of the fourth lens group, and the variable aperture stop is configured to maintain the F-number of the projection zoom lens constant at the time of zooming.

8. The projection zoom lens of claim 2, wherein the projection zoom lens is configured such that focusing is performed by moving the first lens group in an optical axis direction.

9. The projection zoom lens of claim 2, wherein:
the one negative lens constituting the fourth lens group has a meniscus shape with a convex surface on the reduction side; and
the zoom lens satisfies a conditional expression (6) given below:

$$30 < vd \quad (6),$$

where vd is an Abbe number of the negative lens constituting the fourth lens group with respect to d-line.

10. The projection zoom lens of claim 1, wherein the second lens group comprises at least a cemented lens composed of a negative lens with a concave surface on the reduction side and a positive lens with a convex surface on the reduction side.

11. The projection zoom lens of claim 1, wherein the projection zoom lens satisfies a conditional expression (3) given below:

$$1.8 < Bf/fw < 4.0 \quad (3),$$

where, Bf is an air equivalent back focus of the entire lens system on the reduction side.

12. The projection zoom lens of claim 11, wherein the projection zoom lens satisfies a conditional expression (3A) given below:

$$2.0 < Bf/fw < 3.0 \quad (3A).$$

13. The projection zoom lens of claim 1, wherein the projection zoom lens satisfies a conditional expression (4) and a conditional expression (5) given below:

$$ft/fw \geq 1.5 \quad (4); \text{ and}$$

$$2\omega > 65° \quad (5),$$

where:
ft is a focal length of the entire lens system at the telephoto end; and
2ω is a total angle of view at the wide angle end.

14. The projection zoom lens of claim 1, wherein the projection zoom lens includes a variable aperture stop for changing the size of the aperture diameter according to the zooming on the magnification side or reduction side of the fourth lens group, and the variable aperture stop is configured to maintain the F-number of the projection zoom lens constant at the time of zooming.

15. The projection zoom lens of claim 1, wherein the projection zoom lens is configured such that focusing is performed by moving the first lens group in an optical axis direction.

16. The projection zoom lens of claim 1, wherein:
the one negative lens constituting the fourth lens group has a meniscus shape with a convex surface on the reduction side; and
the zoom lens satisfies a conditional expression (6) given below:

$$30 < vd \quad (6),$$

where vd is an Abbe number of the negative lens constituting the fourth lens group with respect to d-line.

17. The projection zoom lens of claim 1, wherein the projection zoom lens satisfies a conditional expression (1A) given below:

$$-10.0 < f4/fw < -5.0 \quad (1A).$$

18. A projection display apparatus, comprising the projection zoom lens of claim 1, a light source, a light valve, and an illumination optical unit for guiding a luminous flux from the light source to the light valve, wherein the luminous flux from the light source is optically modulated by the light valve and the optically modulated luminous flux is projected onto a screen through the projection zoom lens.

* * * * *